US010917558B1

(12) United States Patent
Gherardi et al.

(10) Patent No.: US 10,917,558 B1
(45) Date of Patent: Feb. 9, 2021

(54) DETECTING OVEREXPOSURE IN IMAGES FROM ILLUMINATION

(71) Applicant: Amazon Technologies, Inc., Seattle, WA (US)

(72) Inventors: Riccardo Gherardi, Seattle, WA (US); Saral Jain, Seattle, WA (US); Hasan Tuna Icingir, Seattle, WA (US); Griffin Alexander Jarmin, Seattle, WA (US); Bo Chen, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/688,914

(22) Filed: Nov. 19, 2019

Related U.S. Application Data

(62) Division of application No. 15/635,070, filed on Jun. 27, 2017, now Pat. No. 10,491,808.

(51) Int. Cl.
*G06K 9/00* (2006.01)
*H04N 5/232* (2006.01)

(52) U.S. Cl.
CPC ....... *H04N 5/23216* (2013.01); *G06K 9/0063* (2013.01)

(58) Field of Classification Search
None
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,228,400 | B2 | 7/2012 | Liu et al. |
| 8,423,431 | B1 | 4/2013 | Rouaix et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Atiba O Fitzpatrick
(74) *Attorney, Agent, or Firm* — Athorus, PLLC

(57) ABSTRACT

Described is a method for processing image data to determine if a portion of the image data is affected due to sunlight. In some implementations, image data is sent to an image data store and camera parameters are sent to a radiance detection service. The radiance detection service, upon receiving the camera parameters, retrieves the image data, converts the image data to gray-scale and processes the image data based on the camera parameters to determine a radiance value for the camera. The radiance value may be compared to a baseline radiance value to determine if sunlight is represented in the image data. In some implementations, a baseline model may be developed for the camera and used to cancel out any pixels of the image data that are overexposed under normal or baseline conditions. Likewise, a foreground model may be generated to detect any objects in the image data for which corresponding pixel values should not be considered for determining if sunlight is represented in the image data.

20 Claims, 12 Drawing Sheets

(56) References Cited

U.S. PATENT DOCUMENTS

| | | |
|---|---|---|
| 8,630,924 B2 | 1/2014 | Groenevelt et al. |
| 8,688,598 B1 | 4/2014 | Shakes et al. |
| 8,977,073 B2 | 3/2015 | Kwon et al. |
| 9,131,201 B1 | 9/2015 | Geiss |
| 9,174,800 B1 | 11/2015 | Curlander et al. |
| 9,384,539 B2 | 7/2016 | Park |
| 9,473,747 B2 | 10/2016 | Kobres et al. |
| 2003/0002712 A1 | 1/2003 | Steenburgh et al. |
| 2004/0181467 A1 | 9/2004 | Raiyani et al. |
| 2007/0177050 A1* | 8/2007 | Xiao ............... H04N 5/2351 348/371 |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2010/0328481 A1 | 12/2010 | Shimizu |
| 2011/0011936 A1 | 1/2011 | Morandi et al. |
| 2011/0292455 A1 | 12/2011 | Takabatake et al. |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0176731 A1 | 6/2014 | Geiss |
| 2014/0198218 A1* | 7/2014 | Afrooze ............... G06T 5/40 348/164 |
| 2014/0198226 A1 | 7/2014 | Lee |
| 2014/0279294 A1 | 9/2014 | Field-Darragh et al. |
| 2014/0285675 A1 | 9/2014 | Mullis |
| 2014/0347521 A1 | 11/2014 | Hasinoff et al. |
| 2015/0019391 A1 | 1/2015 | Kumar et al. |
| 2015/0073907 A1 | 3/2015 | Purves et al. |
| 2015/0348242 A1 | 12/2015 | Molgaard et al. |
| 2015/0350509 A1 | 12/2015 | Tico et al. |
| 2015/0371541 A1 | 12/2015 | Korman |
| 2016/0012588 A1 | 1/2016 | Taguchi et al. |
| 2018/0114438 A1 | 4/2018 | Rajagopalan et al. |
| 2018/0176483 A1 | 6/2018 | Knorr et al. |
| 2018/0227562 A1 | 8/2018 | Bleyer et al. |
| 2018/0247505 A1 | 8/2018 | Arai et al. |
| 2018/0288311 A1* | 10/2018 | Baghert ............ H04N 5/23229 |
| 2018/0302571 A1 | 10/2018 | Kudo et al. |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Gamma Correction, https://en.wikipedia.org/wiki/Gamma_correction, 7 pages.

Pharr et al., "Physically Based Rendering: From Theory to Implementation," http://www.pbrt.org:80/ (downloaded Mar. 14, 2017, by web.archive.org), 4 pages.

www.mitsuba-renderer.org, "Physically Based Renderer," http://www.mitsuba-renderer.org:80/ (downloaded Nov. 19, 2016, by web.archive.org), 2 pages.

Zivkovic, Zoran Improved Adaptive Gaussian Mixture Model for Background Subtraction, In Proc. ICPR, 2004, Intelligent and Autonomous Systems Group, University of Amsterdam, The Netherlands, 4 pages.

* cited by examiner

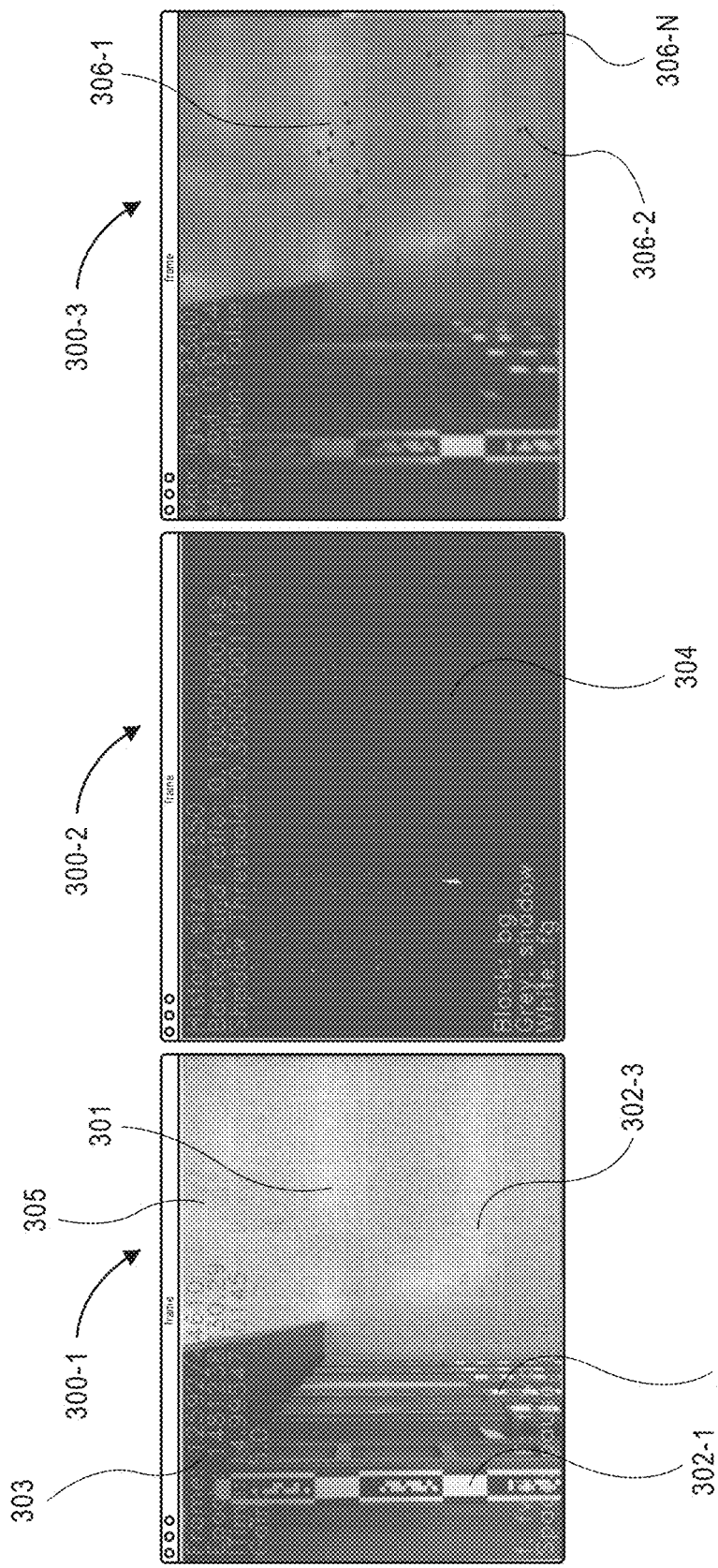

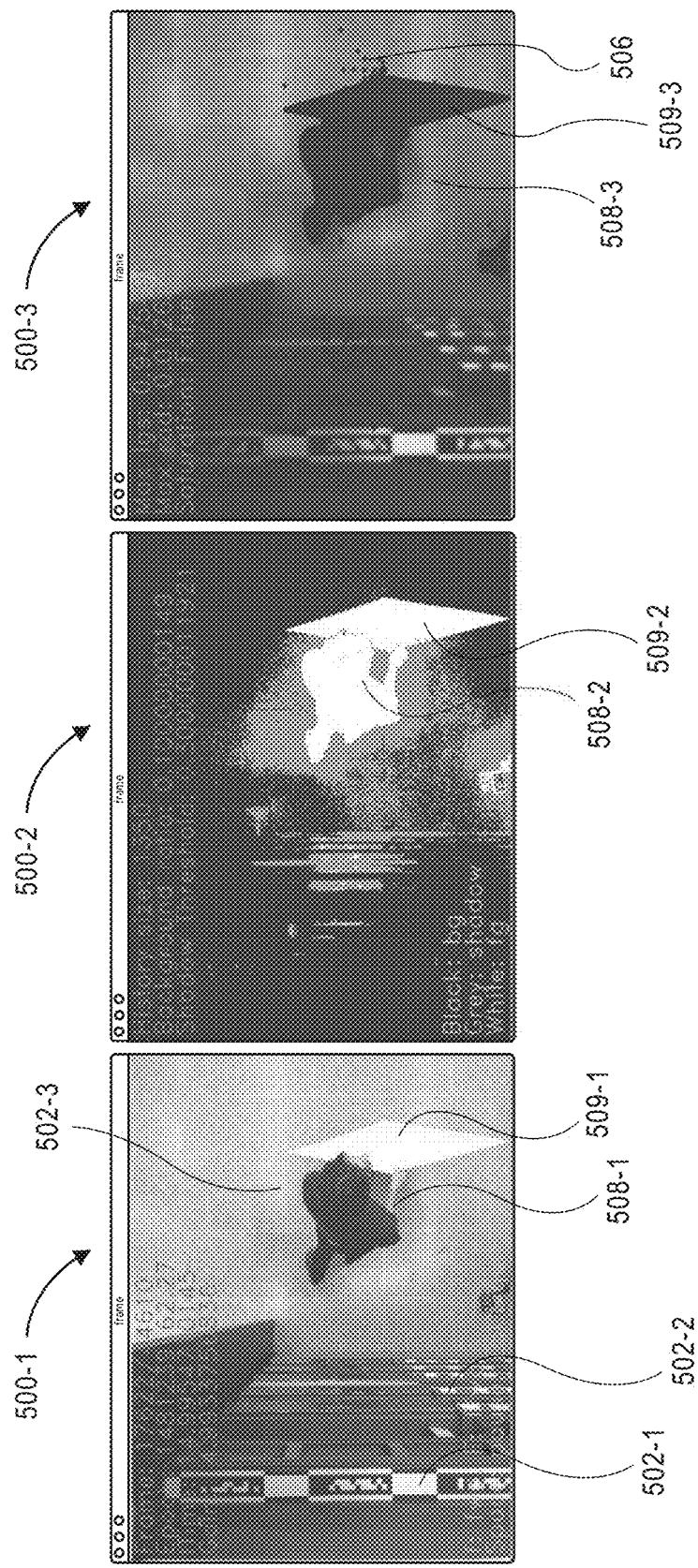

DETECTING OVEREXPOSURE IN IMAGES FROM ILLUMINATION

PRIORITY CLAIM

This application is a Divisional of U.S. patent application Ser. No. 15/635,070, filed Jun. 27, 2017, and titled Detecting Sunlight In Images, the contents of which are herein incorporated by reference.

BACKGROUND

Today, imaging devices such as digital cameras are frequently used for conducting surveillance or monitoring operations. For example, digital cameras are often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Digital cameras are commonplace in financial settings such as banks or casinos, where money changes hands in large amounts or at high rates of speed.

When conducting surveillance or monitoring operations, digital cameras may be aligned and configured to capture imaging data such as still or moving images of actions or events occurring within their respective fields of view. Information regarding the captured imaging data or the observed actions or events may be subjected to further analysis to identify aspects, elements or features of the content expressed therein. In performing such operations, digital cameras may be utilized alone or in groups and objects may be tracked as they move between fields of views of different cameras.

In environments with varying lighting conditions, such as materials handling facilities, transportation centers, financial institutions or like structures in which different light sources are present in different areas, it may be difficult to determine events in regions of images that become overexposed by excessive light from the different light sources.

BRIEF DESCRIPTION OF THE DRAWINGS

FIGS. 3A-3C illustrate a series of images processed in accordance with described implementations.

FIGS. 5A-5C illustrate a series of images processed in accordance with described implementations.

DETAILED DESCRIPTION

Figure 1:
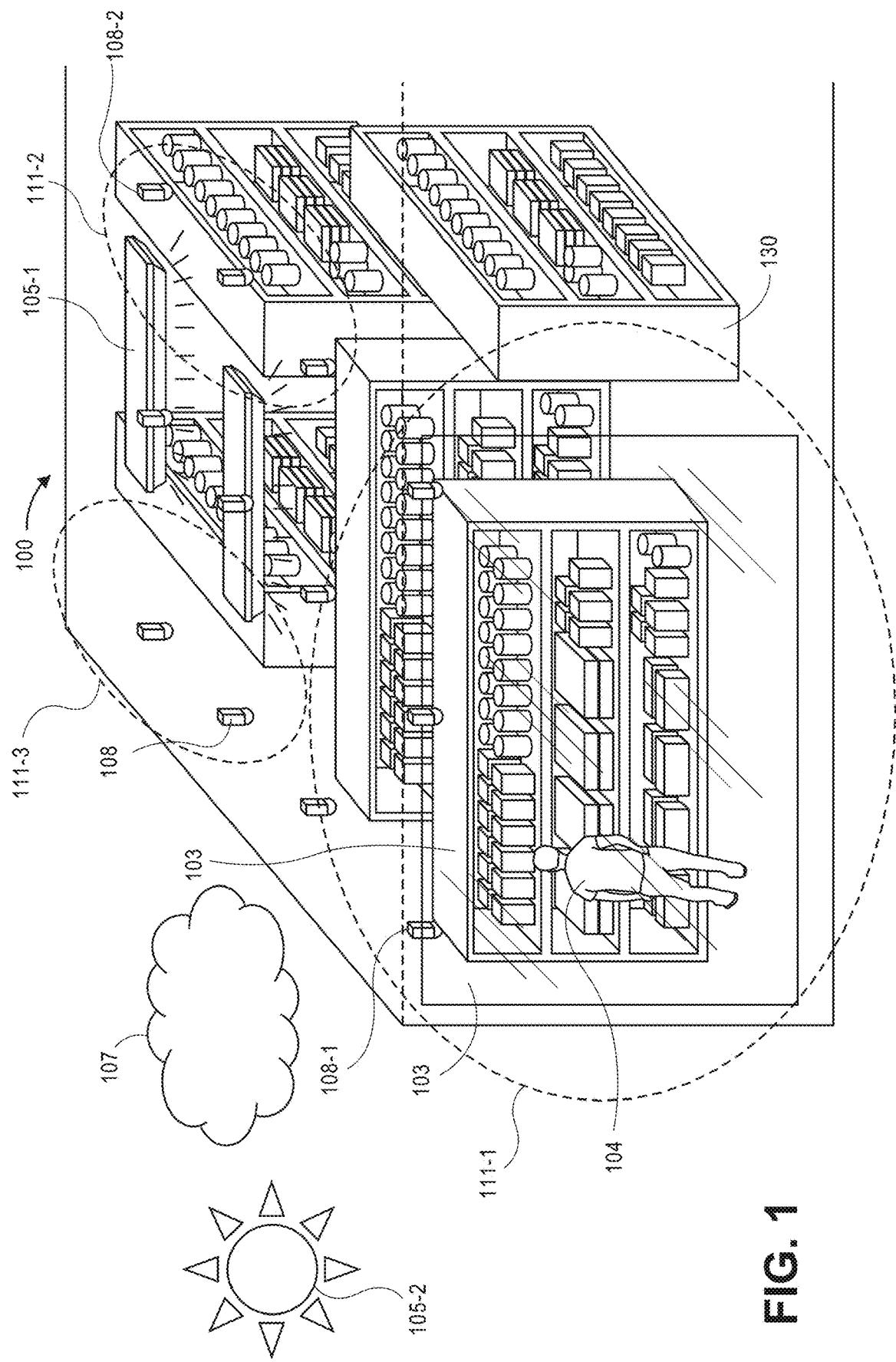
FIG. 1 is a diagram illustrating a materials handling facility with varying lighting conditions, in accordance with described implementations.

This disclosure describes methods, systems, and apparatus for processing image data to determine if a group of pixels within an image are overexposed and not representative of the area being imaged. In some implementations, camera parameters (e.g., integration time and gain of the camera) are used with the image data from the camera to determine a radiance value for each pixel of the image data. Based on the radiance of the pixels, a camera radiance for the camera may be determined, and, if the camera radiance exceeds a threshold, it may be determined that there is a group of pixels within the image that are affected by direct sunlight, or other source of bright light. For example, a portion of the pixels may be overexposed. Overexposure of pixels may result from direct sunlight (or other bright source of light) shining on a portion of the object being imaged of within the field of view of the camera. However, some objects, such as bright objects (e.g., white shirt, highly reflective surfaces) within the field of view of the camera may result in a false detection of overexposure and loss of data. Likewise, in some instances, portions of an area may always produce pixels that appear overexposed (e.g., due to highly reflective materials on a floor within the area). Such known aspects of the area within the field of view of the camera should not result in a detection of overexposed pixels of the image.

In some implementations, to avoid false detection, a baseline model may be generated based on image data generated at a defined time that is representative of the field of view of the camera under normal conditions (e.g., when it is known there is no sunlight). The baseline model may then be used to mask out or eliminate from processing any pixels of the image data that appear saturated and/or overexposed in both a current image and the baseline model. Likewise, a foreground model may be generated for a current image to determine any objects present in the field of view of the camera that should not be considered when determining the radiance of the camera. For example, if an agent is in the field of view of the camera and wearing a bright shirt or carrying a white object that result in the pixels of the image data appearing overexposed should be eliminated from a radiance computation.

The images may be processed by a radiance detection service. A camera parameter collection component incorporated into each camera collects camera parameters (e.g., integration time and gain) as images are generated and provides the camera parameters to the radiance detection service. The radiance detection service, upon receiving the camera parameters, requests and receives from an image data service, image data generated by the camera. The image data is then processed to remove pixels corresponding to detected foreground objects and to remove pixels that are known to be saturated and/or overexposed, based on the baseline model. The remaining pixels are then processed by the radiance detection service based on the camera parameters to determine a radiance value for each pixel. If the radiance of a bounded set of pixels exceeds a threshold, it is determined that at least a portion of the pixels of the image are affected by direct sunlight (or other bright light) and may not include data representative of the imaged area (e.g., a portion of the image may be overexposed). Alternatively, a Gaussian blur process may be performed on each of the remaining pixels to smooth or blur the variation among the pixel values. Subsequent to blurring the pixels, the radiance value for each remaining pixel may be computed and a pixel having the highest radiance value may be specified as the camera radiance value. If the camera radiance value exceeds a threshold, it may be determined that at least a portion of the pixels of the image are affected by sunlight and may not include data representative of the imaged area.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, banks, casinos, airports, or other facilities or combinations of facilities for performing one or more functions of materials (inventory) handling.

"Exposure" is used herein as it is understood in the art. Specifically, exposure refers to the amount of light per unit area (the image plane illuminance times the exposure time) reaching the image sensor, as determined by shutter speed, lens aperture, and sensor sensitivity (ISO) of an imaging device. Exposure is measured in lux seconds. An image, or pixels of an image are considered overexposed when the pixels experience a loss of detail or data such that portions of the imaged object are not represented by the data and the brighter areas represented by the pixels cannot be distinguished from white.

FIG. 1 is a block diagram of a portion of a materials handling facility 100 with varying lighting conditions, in accordance with described implementations. In the illustrated example, the materials handling facility 100 may include a plurality of inventory locations 130 and one or more artificial illumination sources, such as ceiling lighting 105-1, floor lighting, etc., that produce light within the materials handling facility 100. In addition to the illumination sources 105-1 within the materials handling facility, other illumination sources, such as natural illumination sources, including the sun 105-2 or moon, and/or other artificial illumination sources external to the materials handling facility may impart light within one or more areas of the materials handling facility. For example, the materials handling facility may include one or more transparent or semi-transparent perimeters, such as a window 103, doors, skylights, etc., through which light produced from natural and/or artificial illumination source(s) external to the materials handling facility passes to illuminate areas 111 within the materials handling facility.

Light falls on every portion or point within an environment, such as the interior of a materials handling facility, and is then reflected from that environment point. The illumination sources 105 that generate the light reaching different areas within an environment may be characterized by their geometric properties and by their photometric properties. Examples of geometric properties are their shape (e.g., a point source, a light strip (linear source), an area source (sun, moon)) and the directions at which the illumination source 105 spreads the light. The photometric properties of an illumination source 105 refer to the intensity of light that the illumination source 105 emits. In addition, illumination sources 105 generally produce light at different wavelengths. Therefore, we refer to the intensity of light as a function of wavelength, or spectrum. In addition to direct light within an environment, there is also ambient light, which refers to light from all sources that is reflected from other points within the environment (e.g., walls, floors, and ceilings).

Once light falls on an environment point, some of the light is reflected while other parts of the light are absorbed, or reflected in a different direction. In general, we specify the way an object or other material interacts with light by specifying how much light is reflected in every direction, for every incoming direction of the light. The reflectiveness of an object may be referred to as Bidirectional Reflectance Distribution Function ("BRDF"), which may also depend on the wavelength of the light. For purposes of this discussion, we will consider all surfaces of objects as evenly reflecting light in all directions and independent of the direction of the incoming light. In addition, we will refer to the albedo or intrinsic reflectance of an object as the measure of percentage of light that is reflected by the surface of the object. As an example, a black surface has zero reflectance because it absorbs all incoming light. In addition, because the implementations discussed herein relate to detecting sunlight represented in color images, we will assume that reflected light can be represented based on a certain amount of the light reflected in each of the red, green, and blue wavelengths. Light entering the environment can be measured in photons per unit of area per second. Radiance is the amount of reflected light per unit of solid angle in a given direction. Light that enters a camera lens is captured by a photoreceptor on the camera CCD, where it induces a charge amount proportional to its intensity. This amount is linearly amplified by two camera parameters, gain and integration time, which the camera modifies to ensure that a majority of the field of view has proper exposure.

The materials handling facility also includes a network of imaging devices 108. In the illustrated example, each imaging device is arranged in a fixed overhead location and positioned to produce overhead image data of objects located within the field of view of the imaging device. As discussed further below with respect to FIG. 2, any number of imaging devices may be utilized and the imaging devices 108 may be arranged such that the field of view of two or more imaging devices at least partially overlap. In addition, while the example illustrated in FIG. 1 illustrates the imaging devices 108 positioned toward a ceiling of the materials handling facility, in other implementations, as discussed below with respect to FIG. 9, the imaging devices may be at any position within the materials handling facility.

While the implementations discussed herein describe imaging devices in the form of digital color cameras or digital color video cameras, it will be appreciated that the imaging devices may be any form of imaging device including, but not limited to, digital cameras, depth sensors, range cameras, infrared cameras, or radiographic cameras. Likewise, the image data produced by the imaging devices may include, but is not limited to, visual image data, depth image data, infrared image data, radiographic image data, etc. Such devices generally operate by capturing light that is reflected from objects within an environment and integrating the light with a sensor.

Reflected light may be captured or detected by an imaging device if the reflected light is within the device's field of view, which is defined as a function of a distance between a sensor and a lens within the imaging device, viz., a focal length, as well as a location of the imaging device and an angular orientation of the imaging device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, convert, and store information regarding the reflected light in one or more data files. However, as discussed further below, some objects that are naturally bright, such as a white poster, may cause pixels of the image data to appear overexposed, or saturated, because the pixel data is white.

When light is received by an imaging device it is integrated by an image sensor (e.g., a photosensitive surface with a plurality of pixel sensors provided thereon) of the imaging device having one or more filters associated therewith. Such sensors may detect information regarding aspects of any number of pixels of the reflected light corresponding to one or more base colors (e.g., red, green or blue) of the reflected light, or distances to objects from which the light was reflected. Pixel readout is a result of integrating all absorbed photons of light at all wavelengths. In the discussed imaging devices 108, one of three possible color filters are placed before the sensor element. Each color filter essentially modifies the pixel's sensitivity to each wavelength. For example, a red color filter passes mostly photons in the higher wavelengths, so we may think of it as giving the pixel a high sensitivity to higher wavelengths and a low sensitivity to lower wavelengths, such as blue. As a result of the three different color filters (R, G, B), each pixel includes three radiance values, one for each wavelength sensitivity profile.

The radiance values for each pixel are then converted to final R, G, B intensity values, referred to herein collectively as pixel values. The processing involved in producing the final R, G, B intensity values of a pixel involves translation from a raw pixel radiance to a digital value between 0 and 255. This mapping may be linear or with another shape typically involving a parametric form with an exponent termed gamma. In addition to converting the raw pixel value to digital values, each of the values may be scaled by different amounts to compensate for undesired overall color of the image due to the illumination of the environment. This scaling is generally referred to as white balancing. Other adjustments may likewise be made to the pixel values including adjusting for gain, offset, etc. These adjustments are typically performed by the imaging device to account for the illumination of the environment being imaged and are referred to herein generally as imaging device parameters or camera parameters.

An imaging device that is configured to capture and store visual image data (e.g., color images) is commonly called an RGB ("red-green-blue") imaging device (or camera), while an imaging device that is configured to capture both visual image data and depth image data (e.g., ranges) is commonly referred to as an RGBz or RGBD imaging device (or camera). Image data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Many imaging devices also include manual or automatic features for modifying their respective fields of view or orientations. For example, an imaging device may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital imaging device may virtually stretch or condense the pixels of an image in order to focus or broaden the field of view of the digital imaging device, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

As will be appreciated, different areas 111 within a materials handling facility 100 may experience different lighting conditions. For example, a first area 111-1 of the materials handling facility may have a first set of lighting conditions due to natural light passing through a window, direct light from artificial illumination sources within the materials handling facility 100, and ambient light. In comparison, other areas, such as areas 111-2 and 111-3 that are farther within the interior of the materials handling facility may have different lighting conditions because those areas do not receive direct natural light and/or because the light from the artificial illumination sources is different. Still further, the geometry of the areas may impact the lighting conditions. For example, areas with large objects (e.g., inventory shelves) may affect how light falls on surfaces within the area and thus, how much light is eventually received by the imaging devices in that area.

Because the position, orientation, etc., of imaging devices may vary over time and because the illumination of the environment being imaged by the imaging device may likewise vary with respect to time, the imaging device parameters may be adjusted to account for the changes. Lighting conditions within a materials handling facility may change for stationary or adjustable imaging devices. For example, as the time of day, position of the sun 105-2, and/or weather conditions change, such as clouds 107 passing between the sun 105-2 and the materials handling facility 100, the lighting conditions within different areas of the materials handling facility may change. For example, direct sunlight may enter a portion of the materials handling facility during certain times of the day. As another example, if an artificial illumination sources 105-1 within the materials handling facility is altered (e.g., dimmed) or one or more of the artificial illumination sources 105-1 is powered off or becomes inoperable, the lighting conditions may change.

As lighting conditions within an area change, or the field of view of an imaging device changes (e.g., the imaging device is moved, rotated, etc.), the imaging device parameters, also referred to herein as camera parameters, are adjusted to account for the changes in the lighting conditions. Likewise, some objects that are within the materials handling facility, such as white objects, markers, highly reflective surfaces, etc., may be recorded as pixel values having only or mostly white values. Such pixel values are difficult to distinguish from overexposed pixel values that are representative of direct sunlight, or other bright illumination. As a result, as discussed further below, pixel values representative of these objects may be filtered out or removed from consideration as part of the process for determining whether a portion of the image is affected by bright light and may not include data of the imaged area. For example, if an agent 104 is wearing a white shirt, image data that includes a representation of the agent may be improperly determined to include overexposed pixels. To reduce such false positives, the pixel values corresponding to the agent 104 may be detected and removed from consideration.

Figure 2:
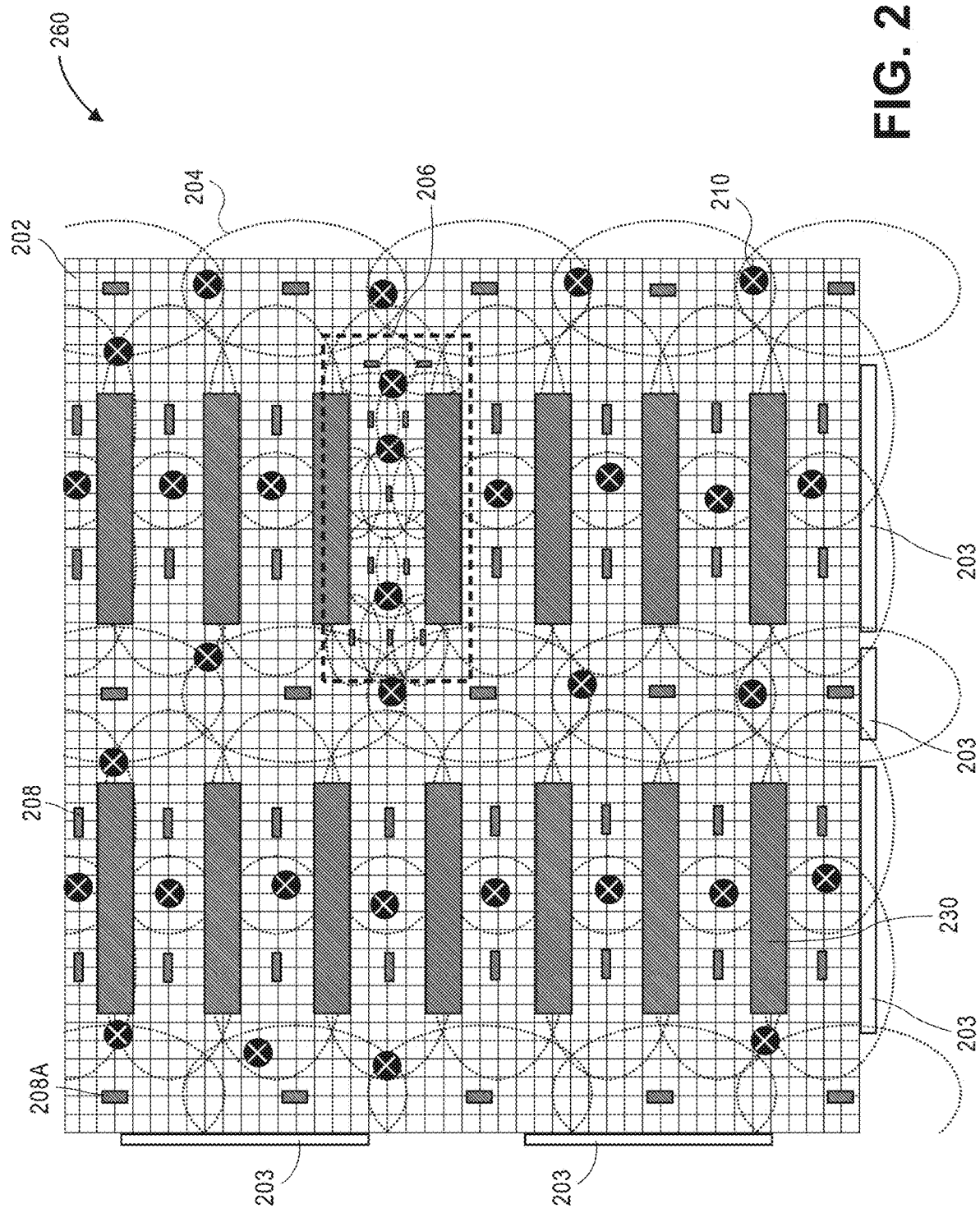
FIG. 2 is a block diagram of an overhead view of a cluster of imaging devices within a materials handling facility, in accordance with described implementations.

FIG. 2 is a block diagram of an overhead view of a cluster 260 of imaging devices within a materials handling facility, in accordance with the described implementations. A cluster may represent a segment of a materials handling facility or all of the materials handling facility. In some implementations, a single materials handling facility may include a plurality of clusters. In other implementations, a single cluster may be used to cover an entire materials handling facility.

Within each cluster 260, a plurality of imaging devices 208 may be positioned overhead (e.g., on a ceiling), referred to herein as overhead imaging devices or overhead cameras, at defined locations so that the collective field of view of the imaging devices covers the entire surface of the portion of the materials handling facility corresponding to the cluster 260. In some implementations, a grid 202 system, physical or virtual, is oriented with the shape of the materials handling facility (e.g., oriented with the walls of the materials handling facility). The grid 202 may be utilized to attach or mount imaging devices within the cluster 260 at defined locations with respect to the physical space of the materials handling facility. For example, in some implementations, the imaging devices may be positioned at any one foot increment from other imaging devices along the grid.

By mounting the imaging devices overhead at defined locations along the grid, the imaging devices can be associated with physical coordinates, also referred to herein as real world positions, within the materials handling facility. For example, if the cluster 260 represents the north-west corner of a materials handling facility, the grid 202 may be segmented into columns and rows and imaging devices may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one foot increments, the physical location within the materials handling facility of every grid intersection and any connected imaging devices is known. In this example, imaging device 208A is positioned at grid coordinate B:3, which corresponds to the horizontal coordinate of the imaging device being positioned approximately two feet by three feet from the origin (in this example the upper left corner) of the cluster.

Because the field of view 204 of the imaging devices 208 may not be circular, the imaging devices may be placed at defined directions (e.g., 0, 90, 180, 270 degrees). The direction of the imaging device may be determined based on the field of view 204 coverage of adjacent imaging devices and/or the layout of objects on the surface of the materials handling facility. For example, if the imaging device 208 is being mounted above an aisle between two inventory locations 230, the direction of the imaging device may be set so that the larger portion of the field of view 204 of the imaging device covers the length of the aisle.

The height of the imaging devices from the surface, the distance between imaging device placement and/or direction of the imaging devices 208 within the cluster 260 may vary depending on the layout of the materials handling facility, the lighting conditions in the cluster, the volume of agents expected to pass through a portion of the cluster, the activities and/or volume of activities expected to occur at different locations within the cluster, etc. For example, imaging devices may typically be mounted horizontally every three to four feet in one direction and every four to five feet in another direction along the grid 202 so that the field of view of each imaging device overlaps, as illustrated in FIG. 2.

In some implementations, the height of the imaging devices from the surface and the distance between imaging devices may be set so that their fields of view intersect and begin to overlap approximately seven feet above the surface of the materials handling facility. Positioning the imaging devices so that the fields of view overlap at approximately seven feet will result in the majority of agents and/or other objects being within a field of view of an imaging device at all times. If the field of view of the imaging devices did not overlap until they were approximately three feet above the surface, as an agent moves between the fields of view, the portion of the agent that is taller than approximately three feet would exit one field of view and not enter the next field of view until the agent has moved into that range of the imaging device. As such, a portion of the agent is not detectable as they transition between fields of view. Likewise, by overlapping the fields of view of multiple imaging devices, each of the overlapping imaging devices may capture images that include representations of the agent from slightly different perspectives and/or capture images of markers located within the materials handling facility.

While this example describes overlapping imaging device fields of view at approximately seven feet above the surface of the materials handling facility, in other implementations, the imaging devices may be positioned so that the fields of view begin to overlap at different heights (e.g., six feet, eight feet). Likewise, as discussed further below, in some implementations, imaging devices may be positioned at locations other than overhead and/or may be different orientations or degrees of tilt. For example, some imaging devices of the cluster 260 may be mounted on the sides of inventory locations 230 and have a field of view that is substantially perpendicular to the field of view of other imaging devices of the cluster 260.

In some areas of the cluster, such as cluster area 206, imaging devices 208 may be positioned closer together and/or closer to the surface area, thereby reducing their field of view, increasing the amount of field of view overlap, and/or increasing the amount of coverage for the area.

Increasing imaging device density may be desirable in areas where there is a high volume of activity (e.g., item picks, item places, agent dwell time), high traffic areas, high value items, poor lighting conditions, etc. By increasing the amount of coverage, the image data increases and/or the amount of field of view overlaps increases, thereby increasing the likelihood that an activity or action will be properly determined.

In some implementations, one or more markers 210 may be positioned throughout the cluster and used with the implementations discussed herein to determine imaging device position and/or determine imaging device parameters of the imaging devices 208. The markers 210 may be placed at any location within the cluster, may be stationary, mobile, permanent, or temporary. In some implementations, the markers 210 may be placed on the surface of the materials handling facility. In other implementations, the markers 210 may be placed on a visible surface of an inventory location 230 within the cluster. In still other implementations, portions of the inventory location 230 itself may be utilized as a marker. Alternatively, or in addition thereto, one or more inventory items that are viewable by the imaging devices may be used as a marker 210. In still other examples, the surface of the materials handling facility may have a detectable pattern, marks, defects, etc., that can be determined and used as markers 210. In general, the markers may be any identifiable object and may be a portion of an inventory location, a mark of the surface of the materials handling facility, a portion of an agent (e.g., a hat, shirt), a machine (e.g., forklift), an item, etc.

FIGS. 3A-3C illustrate a series of images generated and processed in accordance with described implementations. In the example discussed with respect to FIGS. 3A-3C, the image data is generated at a defined time when it is known that only stationary objects that are to remain in the field of view are present and that there is no direct sunlight reaching the field of view. For example, the image data may be generated at night when there is no sunlight and the materials handling facility is not operating. Alternatively, the image data may be generated during an agent break time or lunch hour when agents are not working in the inventory locations within the materials handling facility. During such times, the image data may be used to produce a baseline model that includes representations of objects known or expected to be within the field of view of the imaging device, referred to herein as background objects.

Referring first to FIG. 3A, illustrated is a gray-scale image 300-1 generated by an overhead imaging device within a materials handling facility at a defined time and used as a background image. As discussed above, imaging devices may produce pixel values in which the radiance has been converted into a color space, such as an RGB color space. Such color image data may be converted to gray-scale image data using one of many existing techniques, which are known to those of skill in the art. In other implementations, the overhead imaging device may be a monochrome imaging device that produces gray-scale image data. In still other implementations, the raw image data may be converted to a color space, such as a YUV color space, that includes a luminance channel, which may be used as the gray-scale image data as it is devoid of color.

As illustrated in FIG. 3A, the field of view as represented by the image 300-1 includes background objects, such as the inventory location 303 and the floor 305, or surface. As illustrated, the lighting or luminance of those background objects may vary within the image data and some portions of those background objects may appear overexposed or white in the image data because that portion of the background object is white or otherwise reflects light in a manner that makes it appear white, or makes the pixel value appear or be overexposed. For example, the inventory location may include a marker 302-1 that is bright white. Likewise, the floor 305 or surface may include a reflective material (e.g., paint) that causes the ambient light within the area to reflect and appear white in the image data. Likewise, in some implementations, the lines 302-3 between tiles or other materials on the floor 305 may be represented as white in the gray-scale image 300-1 because of the reflective nature of the material. In some implementations, other luminance variations, such as the reflection 301 of ambient lighting off the floor may be present in the background image data 300-1.

To generate a baseline model, the gray-scale pixel values of the image 300-1 are stored and may be used as a baseline model to cancel out or remove from consideration the stored pixel values for background objects represented by the baseline model so they are not considered when image data is processed to determine if sunlight is represented in the image data. In some implementations, the gray-scale pixel values stored as the baseline model may be subtracted from gray-scale pixels values of a current gray-scale image such that only difference values between the pixel values of the current image data and the pixels values of the baseline model are considered and processed to determine if a portion of the pixels of the current image are affected by bright light (e.g., direct sunlight) and may be overexposed. In another implementation, any pixel having a pixel value in the baseline model that is recorded as white or overexposed may be completely removed from the pixels values of a current image data so they are not considered during processing. In still other implementations, the pixel values of the baseline model may be subtracted from the pixel values of a current image to distinguish between foreground objects and background objects in the image data. In still other examples, foreground subtraction, which compares pixel values of a series of images over time, may be used to detect foreground objects in the image data.

In some implementations, in addition to or as an alternative to using foreground subtraction, and/or a baseline model to mask current image data, a morphological filter may be utilized to eliminate individual or small groups of pixels values that are saturated and/or overexposed. For example, morphological filtering may be applied to current image data to eliminate small sets of pixels that are whitened as a result of the reflective material in the floor.

FIG. 3B illustrates a representation 300-2 of a result of an application of a baseline model applied to the image data 300-1. In this example, because there are no objects in the image data 300-1 and no direct sunlight, the resultant representation 300-2 appears black, because all image data has been canceled out as a result of the application of the baseline model and/or the morphological filtering.

The pixel values corresponding to the image data of the representation 300-2 may then be processed to determine an approximate radiance of the camera based on the pixel values and the camera parameters (e.g., integration time and radiance). Processing is discussed further below with respect to FIGS. 6-7. The result of the processing is a linearized, low-pass filtered gray-scale image 300-3, as illustrated in FIG. 3C. In this example, the resultant gray-scale image 300-3 illustrates that there are no saturated and/or overexposed pixels. In addition, the morphological filtering is represented by the black dots 306-1, 306-2 . . . 306-N, in which pixels of the image data that were recorded as white as a result of the artificial light reflecting off the reflective material on the floor is eliminated.

Figures 4A, 4B, 4C:
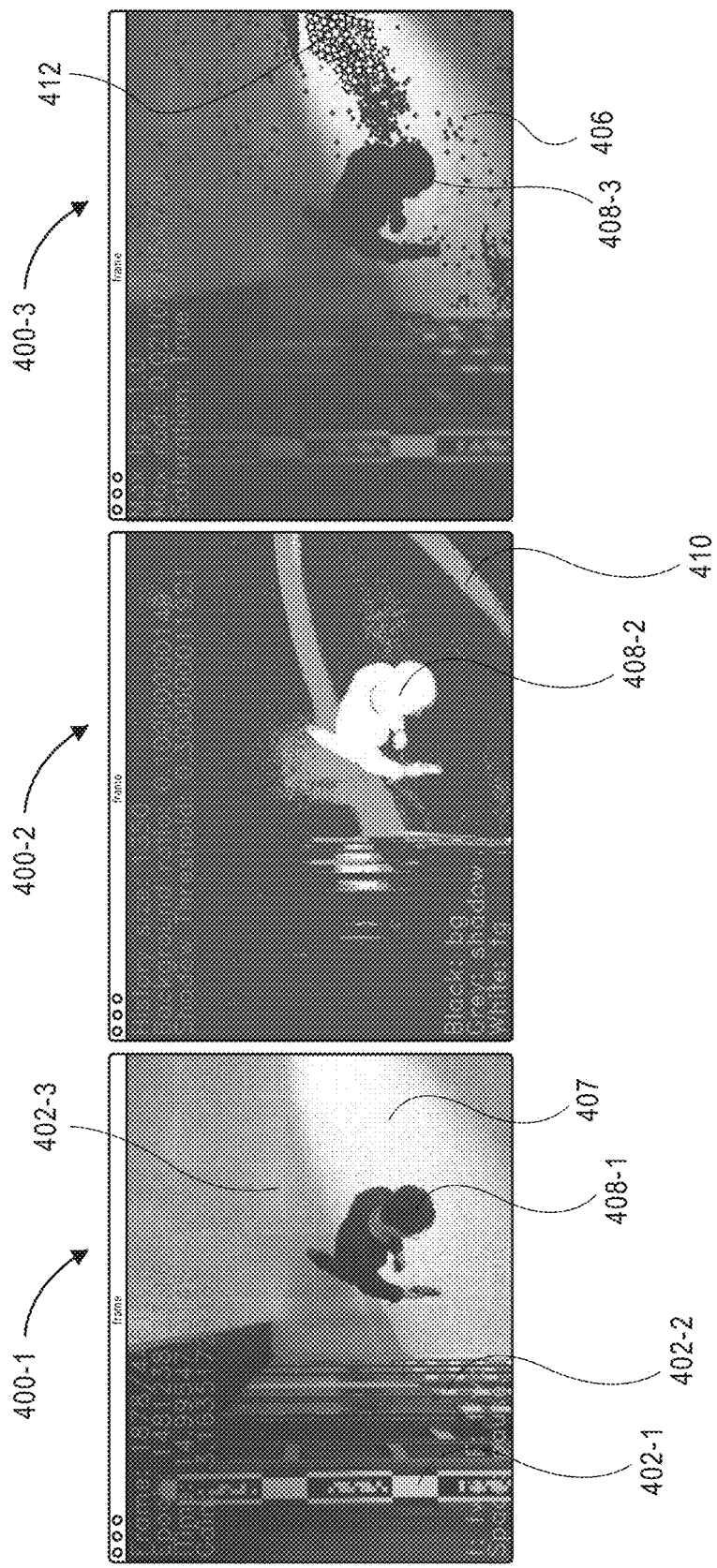
FIGS. 4A-4C illustrate a series of images processed in accordance with described implementations.

FIGS. 4A-4C illustrate a series of images processed in accordance with described implementations. In the example illustrated in FIGS. 4A-4C, the same imaging device discussed with respect to FIG. 3A-3C is utilized. However, as illustrated in FIG. 4A, in this example, an agent 408-1 is present in the field of view and represented in the image data and direct sunlight 407 is illuminating a portion of the area within the field of view. As with the above example, the inventory location includes a marker 402-1 and labels 402-2 that are naturally white in appearance, and there is reflective material 402-3 in the floor or surface that is causes light to reflect and appear white in the image data 400-1.

To detect overexposed pixels in the image data, the baseline model produced for the imaging device, as discussed above with respect to FIGS. 3A-3C, is applied to the image data corresponding to the gray-scale image 400-1. In addition, foreground subtraction may be performed to detect objects, such as the agent 408-1 that are present in the field of view. The representation 400-2 of FIG. 4B illustrates the result of applying the baseline model, foreground subtraction, and morphological filtering of the grey-scale image 400-1. As illustrated, the result of foreground subtraction results in the agent 408-2 being detected as a foreground object and represented as white. Detection of foreground objects, such as the agent 408-2 is used to determine which pixels to eliminate from processing when computing camera radiance to determine if a portion of the image may be affected by bright light (e.g., sunlight). In addition, application of the baseline map results in the detection of a shadow 410 caused by the sunlight.

While the above example utilizes the background model and/or foreground subtraction to detect foreground objects, in some implementations, the image data may also include depth information for each pixel of the image data. In such an example, when the baseline model is established at a defined time, the depth information for each pixel may be retained in the baseline model. When the baseline model is applied to current image data, the depth information for each pixel may be compared and pixels with depth information that is different (or beyond a defined difference threshold e.g., +/−5%) may be determined to correspond to foreground objects.

The image data of the current image that is not known to be white in the baseline model and image data that is not determined to correspond to a foreground object, such as the agent 408-2 is processed using the radiance detection processing discussed below to determine if a portion of the pixels of the image data are affected by bright light and may not include data of the imaged area. In this example, the linearized, low pass filtered gray-scale map 400-3 illustrates the results of processing of the remaining portions of the image data corresponding to gray-scale image 400-1. In this example, the agent is correctly identified as a foreground object and the pixel data corresponding to the agent eliminated, as illustrated by the black representation of the agent 408-3. Likewise, portions of the floor that are known to reflect light as part of the background model are eliminated, as represented by the black dots 406. Finally, the pixels of the image that are determined to represent direct sunlight are represented as stars 412. In this example, because there is a region within the image 400-3 that includes a group of pixels that are overexposed, an alarm or output is generated indicating that the image data includes direct sunlight.

FIGS. 5A-5C illustrate a series of images processed in accordance with described implementations. In the example illustrated in FIGS. 5A-5C, the same imaging device discussed with respect to FIG. 3A-3C is utilized. However, as illustrated in FIG. 5A, in this example, an agent 508-1 is present in the field of view and is holding a bright white poster 509-1. In contrast to the example discussed with respect to FIGS. 4A-4C, there is no direct sunlight in the field of view of the imaging device when the image data represented in FIG. 5A is generated. As with the above example, the inventory location includes a marker 502-1 and labels 502-2 that are naturally white in appearance, and there is reflective material 502-3 in the floor or surface that is causes light to reflect and appear white in the image data 500-1.

Similar to the example discussed above with respect to FIG. 4B, the baseline model produced for the imaging device is applied to the image data corresponding to the gray-scale image 500-1 and/or foreground subtraction is performed to detect objects (e.g., the agent and poster board) represented by the current image data. The representation 500-2 of FIG. 5B illustrates the result of the background segmentation, foreground subtraction, and/or morphological filtering. As illustrated, the foreground subtraction detects the agent 508-2 and the poster 509-2, represented as white, and the background subtraction correctly detects and represents as black the background objects that are known to appear overexposed. Detection of foreground objects, such as the agent 508-2 and the white poster 509-2 is used to determine which pixels to eliminate from processing when determining a camera radiance value.

While the above example utilizes foreground subtraction to detect foreground objects, in some implementations, the image data may also include depth information for each pixel of the image data. In such an example, when the baseline model is established at a defined time, the depth information for each pixel may be retained in the baseline model. When the baseline model is applied to current image data, the depth information for each pixel may be compared and pixels with depth information that is different (or beyond a defined difference threshold e.g., +/−5%) may be determined to correspond to a foreground object. In such an example, shadows may not be detected as part of the application of the background model.

The image data of the current image that is not known to be white in the baseline model and image data that is not determined to correspond to a foreground object, such as the agent 508-2 and the poster 509-2, is processed using the radiance detection processing discussed below to determine a camera radiance value and whether a portion of the image may be affected by bright light, such as direct sunlight. In this example, the linearized, low pass filtered gray-scale image 500-3 illustrates the results of processing of the remaining portions of the image data corresponding to gray-scale image 500-1. In this example, the agent and white poster are both correctly identified as foreground objects and the pixel data corresponding to the agent and the white poster are eliminated, as illustrated by the black representation of the agent 508-3 and the black representation of the poster 509-3. Likewise, portions of the floor that are known to reflect light as part of the background model are eliminated, as represented by the black dots 506. Because there is no direct sunlight in this example, the processing correctly determines there is no overexposed image data.

As discussed herein, it is important to eliminate from consideration pixel values that are known to correspond to white or overexposed values in a background model and also to eliminate pixel values corresponding to foreground objects, such as agents. Elimination of such pixel values makes the radiance detection process resilient to the appearance of bright white objects (e.g., white posters, white shirts, white hats, etc.) in the foreground.

Figure 6:
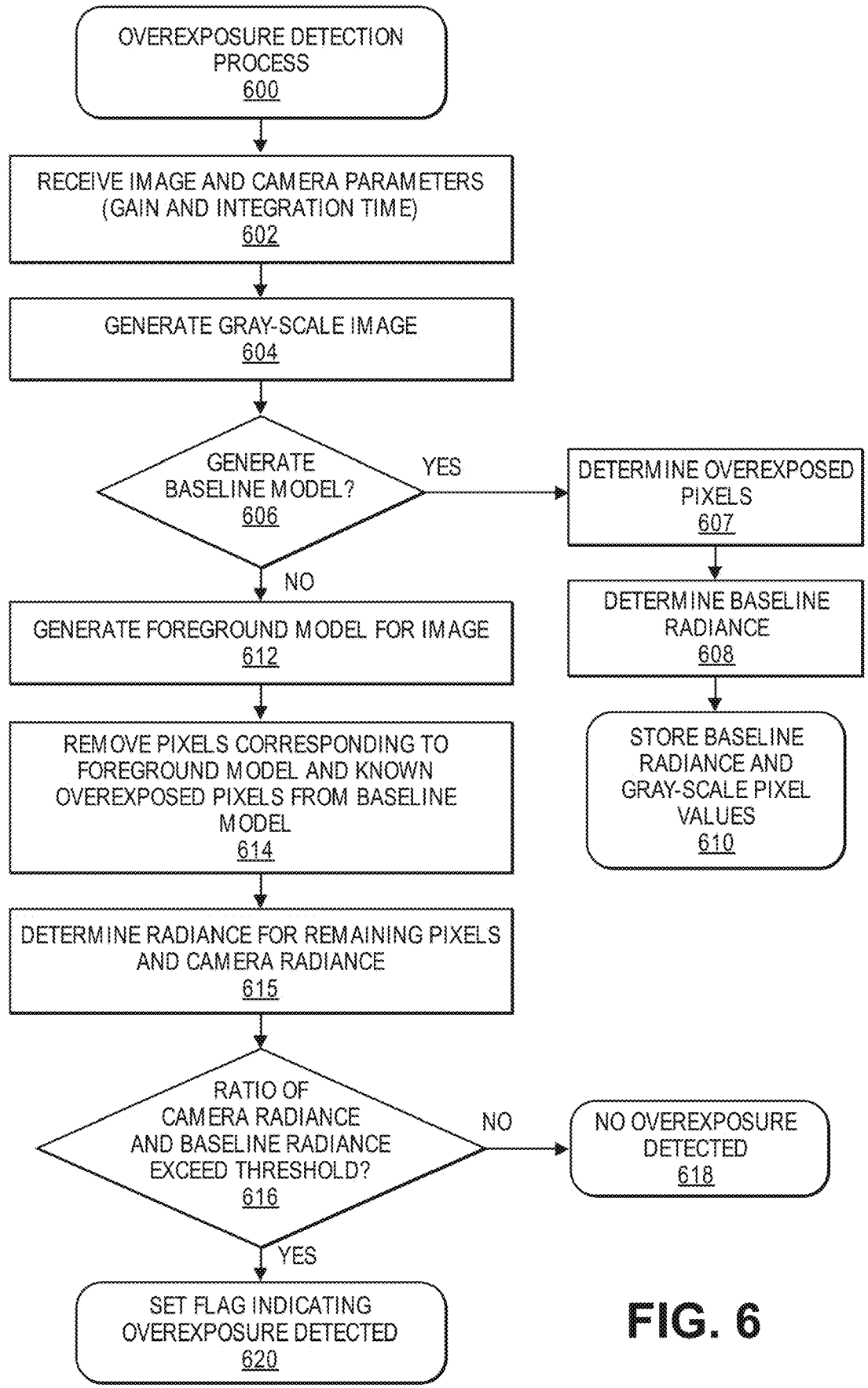
FIG. 6 is a flow diagram of an example radiance detection process, in accordance with described implementations.

FIG. 6 is a flow diagram of an example radiance detection process 600, in accordance with described implementations. The example process 600 begins upon receipt of the camera parameters and image data generated by the camera when using the received camera parameters, as in 602. As discussed further below, in some implementations, the image data and camera parameters may be provided to the example process 600 separately and timestamped. In such an example, when the camera parameters are received, the example process may utilize the timestamp to request and receive, for example from an image data service, the corresponding image data. For example, the example process may provide the timestamp to an image data service and the image data service may provide a series of time based images (e.g., images taken during a two second period of time—image taken every 0.5 seconds) that encompass the timestamp. The example process may then select an image from the series of images that is closest in time to the timestamp and utilize the selected image as the image for processing.

Upon receipt of the image data, the image data is converted to gray-scale image data, as in 604. Alternatively, if the image data includes a luminance channel, the luminance channel may be utilized as the gray-scale image. In still other examples, if the image data is monochrome, it need not be converted to gray-scale. As will be appreciated, image data of any color space may be utilized with the disclosed implementations. In still other implementations, other forms of image data, such as infrared (IR) image data, may be utilized.

The example process 700 then determines if the image data is to be used to produce a baseline model for the imaging device, as in 606. A baseline model may be periodically produced at defined periods of time when conditions are known to not include direct sunlight in the field of view of the imaging device and/or when only background objects (e.g., inventory locations) are in the field of view of the imaging device. For example, a baseline model may be produced at a defined time each night when there is no direct sunlight and no agents are located in the portion of the materials handling facility in which the imaging device is positioned.

If it is determined that a baseline model is to be produced, overexposed pixels included in the image data are determined, as in 607. Overexposed pixels of a gray-scale image may correspond background objects that are white and result in the image data being recorded as a white value or otherwise indicated as overexposed. As discussed above, white markers, white labels on inventory shelves, reflective material in a floor or surface, or other white objects in the background objects may result the corresponding pixels of the image data being recorded as white or overexposed.

In addition to determining overexposed pixels in the image data, a baseline radiance value for the imaging device is determined, as in 608. As discussed above, image data is produced from the radiance recorded by the image sensor of a camera and adjusted based on camera parameters and modulated with a linear or non-linear gamma and tone function. While this is done by the camera for different colors, when considering a gray-scale representation, the gray-scale value of each pixel may be computed as:

$$g = \gamma(iT * G * R) \tag{1}$$

where g represents the gray-scale value of the pixel, γ represents the gamma and tone function, G represents the gain of the imaging device, iT represents the integration time of the imaging device, and R represents the radiance of the pixel. Because the radiance is not known directly from the image data, the radiance may be approximated as:

$$\tilde{R} = \frac{\gamma^{-1}(g)}{iT * G} \tag{2}$$

Utilizing the above equation (2) and the received camera parameters, which include the integration time (iT) and gain (G) a baseline radiance value $\tilde{R}$ may be computed for each pixel of the image data and stored as part of the baseline model. Finally, the baseline radiance values and gray-scale pixel values of the image data are stored as the baseline model, as in 610. In some implementations, the received image data may also include depth information for each pixel. The depth information represents a depth between the imaging device and the object represented by the pixel. In such an implementation, the depth information may also be stored as part of the background model as indicating a distance of each background object, represented by each pixel, of the background model.

In some implementations, a Gaussian blur may be applied to the radiance values and/or to the gray-scale image data before the radiance is computed for each pixel, to smooth any variation among the values. Upon application of a Gaussian blur, the highest radiance value of the pixels may be selected as the camera radiance value corresponding to that image, which may be stored as the baseline radiance value for the camera.

Returning to decision block 606, if it is determined that the image data is not to be used to generate a baseline model, a foreground model is generated for the image data, as in 612. In some implementations, the foreground model is generated by applying an existing baseline model to the image data to cancel out pixel values corresponding to background objects and to detect pixels corresponding to foreground objects. For example, if the background model includes depth information, the depth information of the background model and depth information of the received image data may be compared and pixels with different depths may be determined to correspond to or represent foreground objects (e.g., agents). Alternatively, foreground subtraction may be performed on a series of images to detect foreground objects.

Pixels corresponding to foreground objects and pixels of the background model that are known to be overexposed are removed or eliminated from consideration, as in 614. As discussed, elimination or removal of pixels that are known to be overexposed or that represent foreground objects reduces instances of incorrect identification of overexposed pixels of the image data, which may be the result of direct sunlight in the image data. In particular, because of the approximation of radiance from a gray-scale image does not take into account the BRDF of the object represented in the image, the image data may represent a white object (e.g., white shirt) with the same pixel values as an overexposed pixel.

Utilizing equation (2) above, an approximate radiance value may be computed for each pixel of the remaining image data and a camera radiance may be determined, as in 615. Similar to the baseline model, a Gaussian blur may be applied to smooth out variations among radiance values and a highest radiance value may be selected as the camera radiance value.

A determination is then made as to whether a ratio between the camera radiance and the baseline radiance exceeds a threshold, as in 616. In other implementations, rather than or in addition to computing a ratio, it may be determined whether a group of pixels within the image data have radiance values that exceed a threshold radiance value. Requiring a group of pixels to have radiance values exceeding the threshold radiance value, rather than just one pixel, further reduces false detection of direct sunlight in an image as direct sunlight will impact and be represented by several pixels of the image data.

In still other examples, rather than or in addition to computing radiance, the gray-scale pixel values of the pixels may be Gaussian blurred to smooth out variations among the gray-scale pixel values and a threshold may be applied the Gaussian blurred gray-scale pixel value to determine any gray-scale pixel values above the threshold. If there are gray-scale pixel values above the threshold, it may further be determined if there is a sufficient size group (e.g., 5×5 area of pixels) of gray-scale pixel values that exceed the threshold and, if so, it may be determined that at least a portion of the image is affected by sunlight, referred to herein as saturated, or saturated with light.

If it is determined that the ratio exceeds a threshold, that there are a group of pixels with radiance values that exceed the radiance value threshold, and/or that there are a group of gray-scale pixel values that exceed the threshold, an alarm, flag, or other output is set or generated indicating that direct sunlight is represented by at least a portion of the image data, as in 620. If it is determined that the ratio does not exceed the threshold, that there is no group of pixels having radiance values that exceed the radiance value threshold, and/or that there is no group of gray-scale pixel values that exceed a threshold, it is determined that there is no direct sunlight detected or represented in the image data, as in 618.

In some implementations, multiple results from the same or different imaging elements may be aggregated to determine whether direct sunlight is entering a portion of the materials handling facility and potentially causing overexposure and/or saturation of a portion of the image data from a group of imaging devices. For example, processed image data from a cluster of imaging devices within an area of a material handling facility may be aggregated to determine whether an indication is to be provided to other services indicating that direct sunlight is detected in that area of the materials handling facility.

Figure 7:
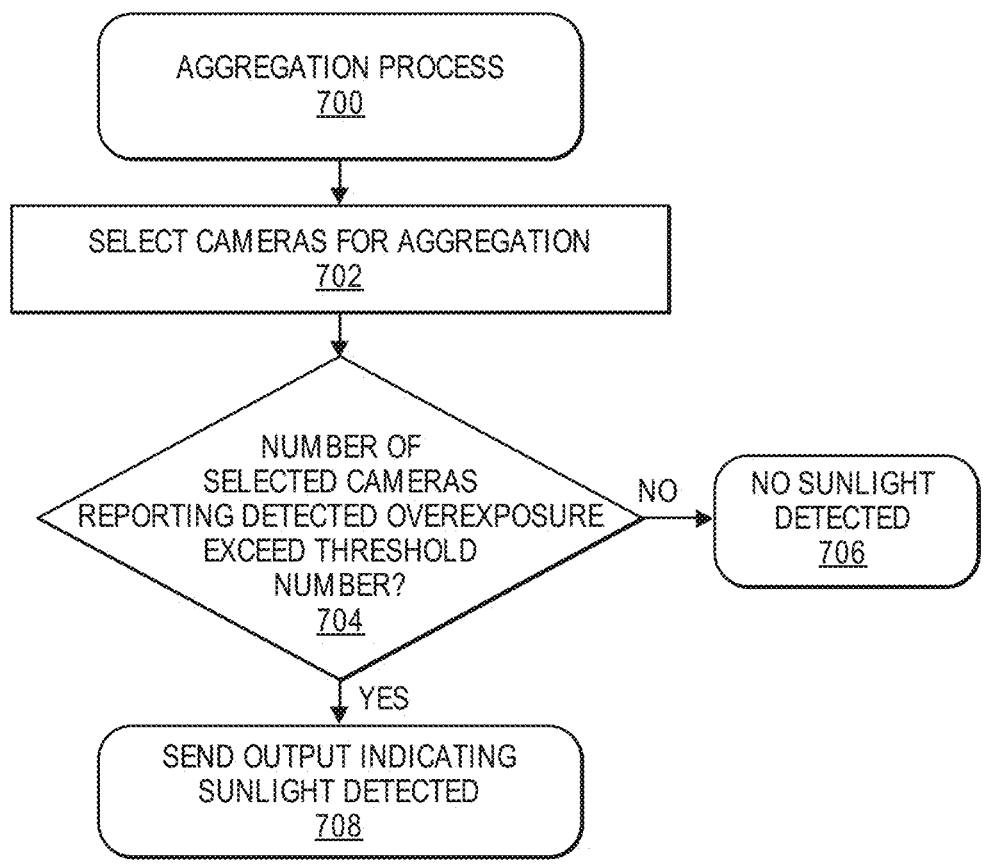
FIG. 7 is a flow diagram of an example aggregation process, in accordance with described implementations.

FIG. 7 is a flow diagram of an example aggregation process 700, in accordance with described implementations. The example process 700 begins by selecting a group of one or more imaging devices for aggregation, as in 702. Any number of imaging devices from any area within the materials handling facility may be selected for aggregation.

For the selected imaging devices, the following functions may be determined:

$$f_M(R,S) = 1_t(R)$$

$$f_M(R,S) = \begin{cases} f_M(R, 0) = f_M(R, S) \\ f_M(R, 1) = 1 \end{cases}$$

where R and S represent, respectively, the radiance value (range: $[0 \ldots \infty[$) and saturation (range: $[0,1]$) and 1 is step function switching from 0 to 1 at a threshold t. The saturation of the image may be determined based on a Gaussian blurred gray-scale image values of the pixels. For example, the threshold (t) may be applied to the gray-scale image values of the image to determine which pixels or group of pixels exceed the threshold. If there are group of Gaussian blurred gray-scale pixel values that exceed the threshold, it may be determined that at least a portion of the image is saturated, or saturated with light.

The index M may correspond to one of the following methods that may be utilized with the described implementations. For example, M may correspond to Foreground Subtraction (FS) method that uses foreground subtracted image data, discussed above, to remove foreground data from the process for computing radiance. M may also correspond to a baseline model (BM) that is used to compute a baseline radiance and/or saturation, as also discussed above. M may also correspond to a masked background (MB) in which the baseline model is applied for areas known to be saturated, or saturated with light. Finally, M may represent any of the above methods with an accent bar, indicating that an alarm or other output is generated if the radiance, or ratio of the current radiance and baseline radiance exceeds a defined value.

The above defines six different functions. Indicating with T the function selected and with bold R and S, respectively, arrays of radiance and saturation values for a particular set of imaging devices of size C, we can define a per camera cluster function as:

$$A(\mathbf{R}, \mathbf{S}) = 1_N \sum_{i=1}^{C} f_T(R^i, S^i)$$

The per camera cluster function may be configured to produce an output indicating that direct sunlight is detected if N or more imaging devices generate an alarm or other output for the chosen method and threshold, as in 704. If it is determined that N or more imaging devices generate an alarm or other output, a flag or other output is sent to subscribing services indicating that direct sunlight has been detected in the image data, as in 708. If it is determined that N imaging devices did not generate an alarm or other output, no alarm is sent, as in 706

Figure 8:
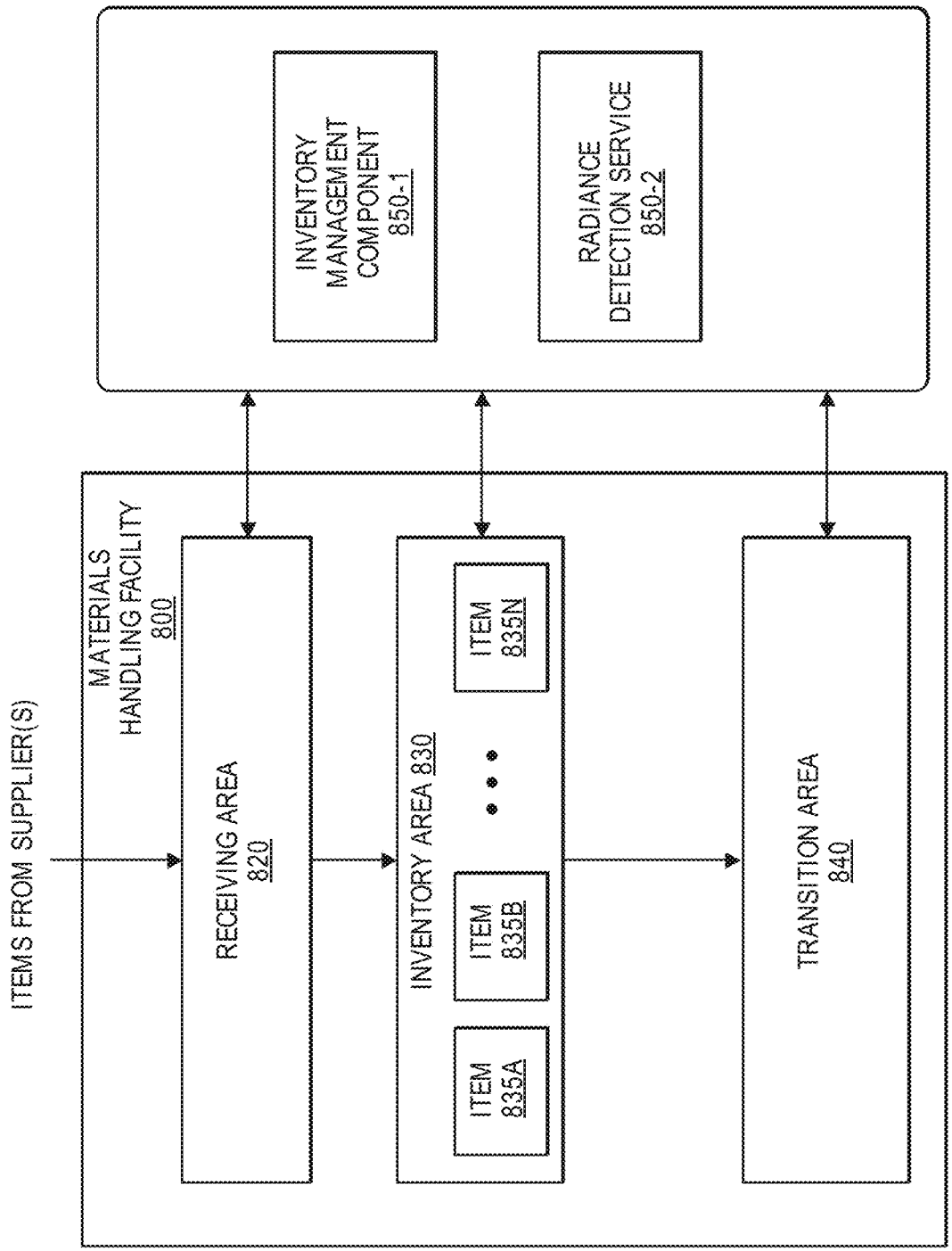
FIG. 8 is a block diagram illustrating a materials handling facility, in accordance with described implementations.

FIG. 8 illustrates a block diagram of a materials handling facility configured to store and manage inventory items, in accordance with the described implementations. As shown, a materials handling facility 800 includes a receiving area 820, an inventory area 830 configured to store an arbitrary number of inventory items 835A-835N, and one or more transition areas 840. The arrangement of the various areas within materials handling facility 800 is depicted functionally rather than schematically. For example, in some implementations, multiple different receiving areas 820, inventory areas 830 and/or transition areas 840 may be interspersed rather than segregated. Additionally, the materials handling facility 800 includes an inventory management component 850-1 configured to interact with each of receiving area 820, inventory area 830, transition area 840 and/or agents within the materials handling facility 800. Likewise, the materials handling facility includes a radiance detection service 850-2 configured to interact with imaging devices within the materials handling facility and process image data, based on camera parameters, to determine if sunlight is present in the materials handling facility and/or represented in at least a portion of the image data.

The materials handling facility 800 may be configured to receive different kinds of inventory items 835 from various suppliers and to store them until an agent retrieves one or more of the items. The general flow of items through the materials handling facility 800 is indicated using arrows. Specifically, as illustrated in this example, items 835 may be received from one or more suppliers, such as manufacturers, distributors, wholesalers, etc., at receiving area 820. In various implementations, items 835 may include merchandise, commodities, perishables, or any suitable type of item depending on the nature of the enterprise that operates the materials handling facility 800.

Upon being received from a supplier at receiving area 820, items 835 may be prepared for storage. For example, in some implementations, items 835 may be unpacked or otherwise rearranged and the inventory management component (which, as described, may include one or more software applications executing on a computer system) may be updated to reflect the type, quantity, condition, cost, location or any other suitable parameters with respect to newly received items 835. It is noted that items 835 may be stocked, managed or dispensed in terms of countable, individual units or multiples of units, such as packages, cartons, crates, pallets or other suitable aggregations. Alternatively, some items 835, such as bulk products, commodities, etc., may be stored in continuous or arbitrarily divisible amounts that may not be inherently organized into countable units. Such items 835 may be managed in terms of measurable quantities, such as units of length, area, volume, weight, or other dimensional properties characterized by units of measurement. Generally speaking, a quantity of an item 835 may refer to either a countable number of individual or aggregate units of an item 835 or a measurable amount of an item 835, as appropriate.

After arriving through receiving area 820, items 835 may be stored within inventory area 830 on an inventory shelf. In some implementations, like items 835 may be stored or displayed together in bins, on shelves or via other suitable storage mechanisms, such that all items 835 of a given kind are stored in one location. In other implementations, like items 835 may be stored in different locations. For example, to optimize retrieval of certain items 835 having high turnover or velocity within a large physical facility, those items 835 may be stored in several different locations to reduce congestion that might occur at a single point of storage.

When an order specifying one or more items 835 is received, or as an agent progresses through the materials handling facility 800, the corresponding items 835 may be selected or "picked" (an event) from the inventory area 830. For example, in one implementation, an agent may have a list of items to pick and may progress through the materials handling facility picking items 835 from the inventory area 830. In other implementations, an agent may pick items 835 using written or electronic pick lists derived from orders. In some instances, an item may need to be repositioned from one location within the inventory area 830 to another location. For example, in some instances, an item may be picked from its inventory location, moved a distance, and placed (an event) at another location. An "event," as used herein, is a detected movement of an item. For example, an event may be a detected movement of an item when the item is picked from an inventory location or a detected movement of an item when the item is placed at an inventory location.

As discussed herein, as the agent moves through the materials handling facility, images of the agent may be obtained and processed to determine an agent pattern representative of the agent and to track a position of the agent as the agent moves. Likewise, in some implementations, descriptors representative of the agent may be periodically determined for the agent from the obtained images as the agent moves about the materials handling facility.

Figure 9:
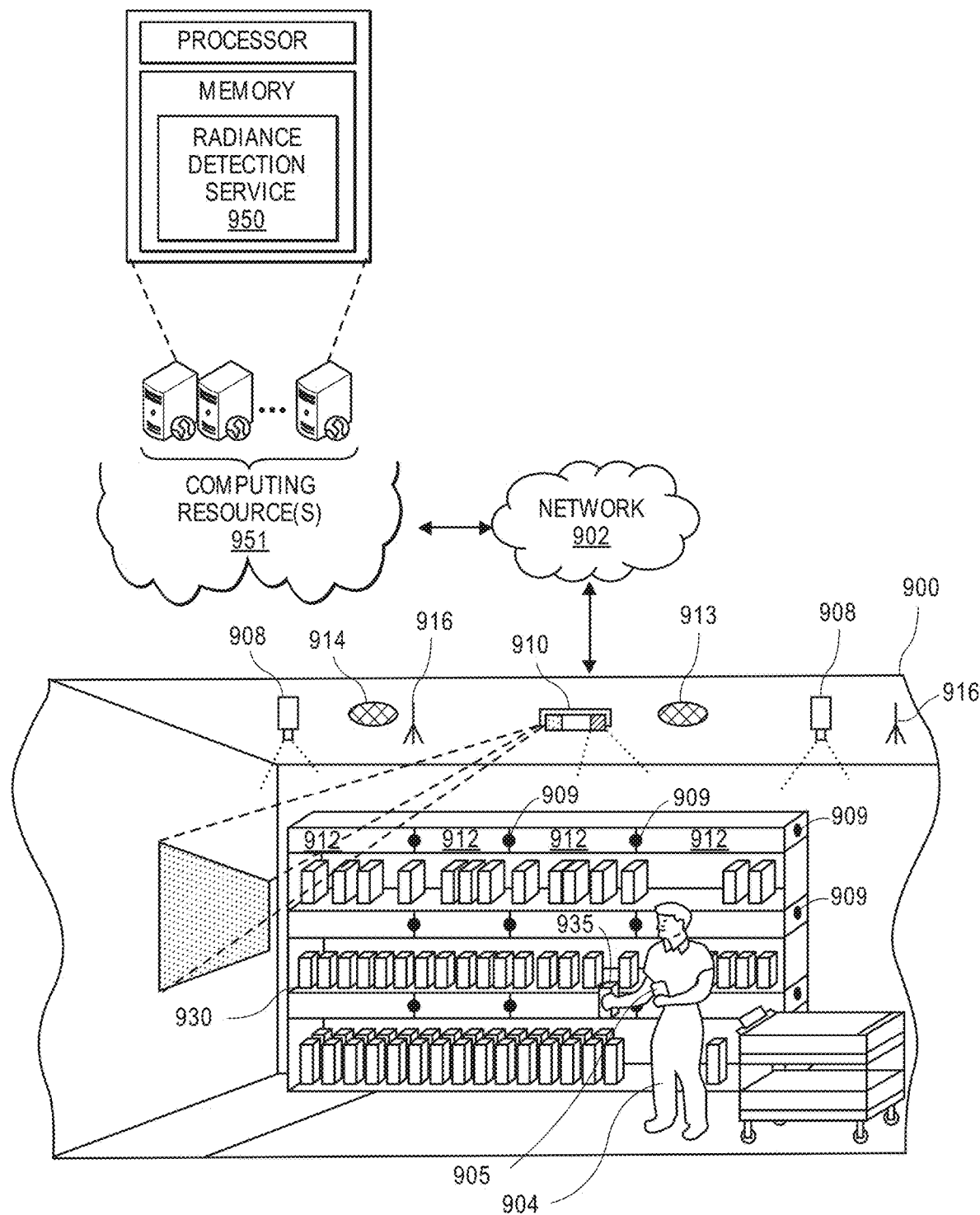
FIG. 9 shows additional components of the materials handling facility of FIG. 8, in accordance with described implementations.

FIG. 9 shows additional components of a materials handling facility 900, according to one implementation. Generally, the materials handling facility 900 may include one or more imaging devices 908, 909, such as cameras. In some implementations, the overhead imaging devices 908 may be positioned overhead, such as on the ceiling, and oriented toward a surface (e.g., floor) of the materials handling facility so that the overhead imaging devices 908 are approximately perpendicular with the surface and the field of view is oriented toward the surface. The overhead imaging devices 908 are used to capture images of agents and/or locations within the materials handling facility from an overhead or top-down view. Likewise, one or more side-view imaging devices 909 may be positioned on, inside, or adjacent to inventory areas and/or otherwise positioned and oriented so that an inventory location is within a field of view of the side-view imaging device 909. For example, a series of side-view imaging devices 909 may be positioned on external portions of inventory areas and oriented to capture images of agents and/or other inventory locations (e.g., those on an opposite side of an aisle). In some implementations, side-view imaging devices 909 may be arranged throughout the materials handling facility such that each inventory location is within a field of view of at least two side-view imaging devices 909.

Any type of imaging device and/or configuration of imaging devices may be used with the implementations described herein. In addition to imaging devices, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, an RFID reader that can detect a tag included on an item as the item passes into or out of the inventory location may be utilized to detect the presence or absence of an item. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an agent 904 arrives at the materials handling facility 900, one or more overhead images of the agent 904 may be captured and processed to detect the agent. In addition, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, etc. The image data may likewise be used to generate an agent pattern representative of the agent to facilitate tracking of the agent while the agent is located in the materials handling facility.

In addition to establishing an agent pattern when the agent first arrives at the materials handling facility and is identified, one or more descriptors representative of the agent or the agent pattern may be determined. For example, one or more descriptor regions may be established, such as a torso region or a head region, and a descriptor representative of the region may be determined, stored in a descriptor data store and associated with the agent or the agent pattern while the agent is located in the materials handling facility. In some implementations, the determined agent patterns of the agent may be stored and maintained as representative of the agent and used at a later point in time to identify the agent (e.g., when the agent returns to the materials handling facility on a different date). In comparison, the descriptors may only be stored for a limited period of time and used to identify the agent during the current time they are in the materials handling facility. When the agent exits the materials handling facility, the descriptors may be discarded.

Returning to FIG. 9, in some implementations, an agent located in the materials handling facility 900 may possess a portable device 905 and obtain information about items located within the materials handling facility 900, receive confirmation that the inventory management component 850-1 (FIG. 8) has correctly identified items that are picked and/or placed by the agent, receive requests for confirmation regarding one or more event aspects, etc. Generally, the portable device has at least a wireless module to facilitate communication with the management components 850 (e.g., the inventory management component) and a display (e.g., a touch based display) to facilitate visible presentation to and interaction with the agent. The portable device 905 may store a unique identifier and provide that unique identifier to the management components 850 and be used to identify the agent. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management components 850. Likewise, components of the management components 850 may interact and communicate with the portable device as well as identify the agent, communicate with the agent via other means and/or communicate with other components of the management components 850.

Generally, the management components 850 and/or the radiance detection service 950 may include one or more input/output devices, such as imaging devices (e.g., cameras) 908, projectors 910, displays 912, speakers 913, microphones 914, illumination elements (e.g., lights), etc., to facilitate communication between the management components 850 and/or the agent and detection of items, events and/or other actions within the materials handling facility 900. In some implementations, multiple input/output devices may be distributed within the materials handling facility 900. For example, there may be multiple imaging devices, such as imaging devices located on the ceilings (overhead cameras) and/or cameras (such as pico-cameras) located in the aisles near the inventory items (side-view cameras).

Likewise, the management components 850 may also include one or more communication devices, such as wireless antennas 916, which facilitate wireless communication (e.g., Wi-Fi, Near Field Communication (NFC), Bluetooth) between the management components 850 and other components or devices. The management components 850 may also include one or more computing resource(s) 951, such as a server system, that may be local to the environment (e.g., materials handling facility), remote from the environment, or any combination thereof.

The management components 850 may utilize antennas 916 within the materials handling facility 900 to create a network 902 (e.g., Wi-Fi) so that the components and devices can connect to and communicate with the management components 850. For example, when the agent picks an item 935 from an inventory area 930, image data from an imaging device may be processed to detect the removal of the item and the management components 850 may receive information, such as image data of the performed action (item pick from the inventory area), identifying that an item has been picked from the inventory area 930. The event aspects (e.g., agent identity, action performed, item involved in the event) may then be determined by the management components 850.

The radiance detection service 950, which may be operating on one or more of the computing resources 951 may communicate with one or more of the management components, imaging devices, etc., process images generated by the imaging devices, as described herein, and provide output to other services or components indicating whether sunlight or other illumination is detected in the images generated by the imaging devices.

Figure 10:
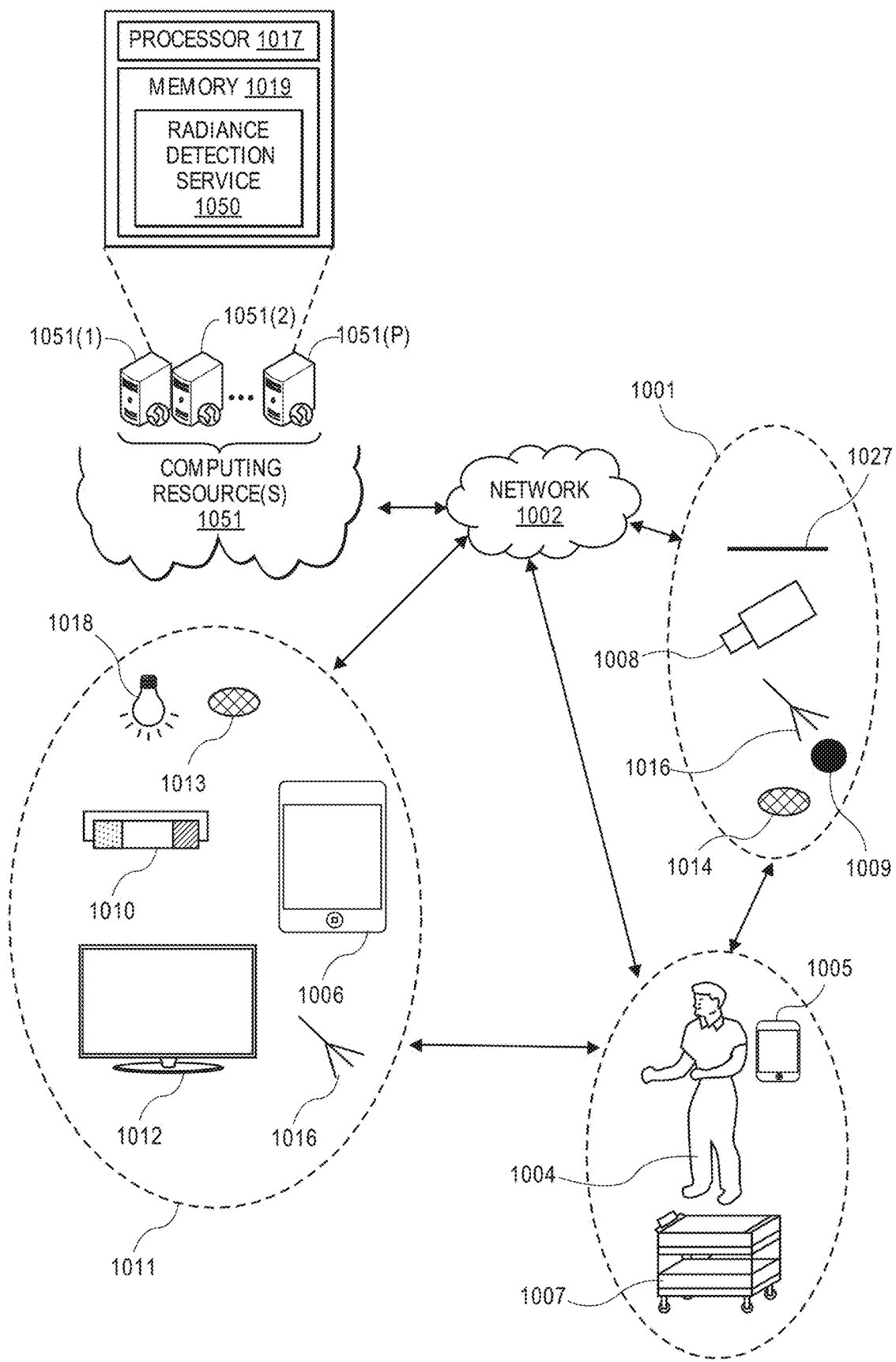
FIG. 10 shows components and communication paths between component types utilized in a materials handling facility of FIG. 8, in accordance with described implementations.

FIG. 10 shows example devices and communication paths between device types utilized in a materials handling facility, according to described implementations. A portable device 1005 may communicate and interact with various devices over a variety of communication paths. Generally, the system may include input components 1001, output components 1011 and computing resource(s) 1051. The input components 1001 may include an overhead imaging device 1008, side-view imaging device 1009, a multiple-device apparatus 1027, microphone 1014, antenna 1016, or any other device or component that is capable of receiving input about the surrounding environment and/or from the agent. The output components 1011 may include a projector 1010, a portable device 1006, a display 1012, an antenna 1016, a radio (not shown), speakers 1013, illumination sources 1018 (e.g., lights), and/or any other device or component that is capable of providing output to the surrounding environment and/or the agent.

The system may also include computing resource(s) 1051. The computing resource(s) 1051 may be local to the environment (e.g., materials handling facility), remote from the environment, or any combination thereof. Likewise, the computing resource(s) 1051 may be configured to communicate over a network 1002 with input components 1001, output components 1011 and/or directly with the portable device 1005, an agent 1004 and/or the tote 1007.

As illustrated, the computing resource(s) 1051 may be remote from the environment and implemented as one or more servers 1051(1), 1051(2), . . . , 1051(P) and may, in some instances, form a portion of a network-accessible computing platform implemented as a computing infrastructure of processors, storage, software, data access, and so forth that is maintained and accessible by components/devices of the system materials handling facility and/or the portable device 1005 via a network 1002, such as an intranet (e.g., local area network), the Internet, etc. The computing resources 1051 may process images of agents to identify the agent, process images of items to identify items, determine a location of items, determine a position of items, determine if sunlight is present in one or more of the generated images, and the like. The server system(s) 1051 does not require end-agent knowledge of the physical location and configuration of the system that delivers the services. Common expressions associated for these remote computing resource(s) 1051 include "on-demand computing," "software as a service (SaaS)," "platform computing," "network-accessible platform," "cloud services," "data centers," and so forth.

Each of the servers 1051(1)-(P) include a processor 1017 and memory 1019, which may store or otherwise have access to management components 850 (FIG. 8), which may include or provide image processing (e.g., for agent identification, item identification, etc.), inventory tracking, and/or location determination, and also may store or otherwise have access to the radiance detection service 1050.

The network 1002 may utilize wired technologies (e.g., wires, USB, fiber optic cable, etc.), wireless technologies (e.g., radio frequency, infrared, NFC, cellular, satellite, Bluetooth, etc.), or other connection technologies. The network 1002 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The various sensors and computer systems described above may collect a wide variety of data relating to users of systems or facilities employing such sensors or computer systems. The data relating to users may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

Figure 11:
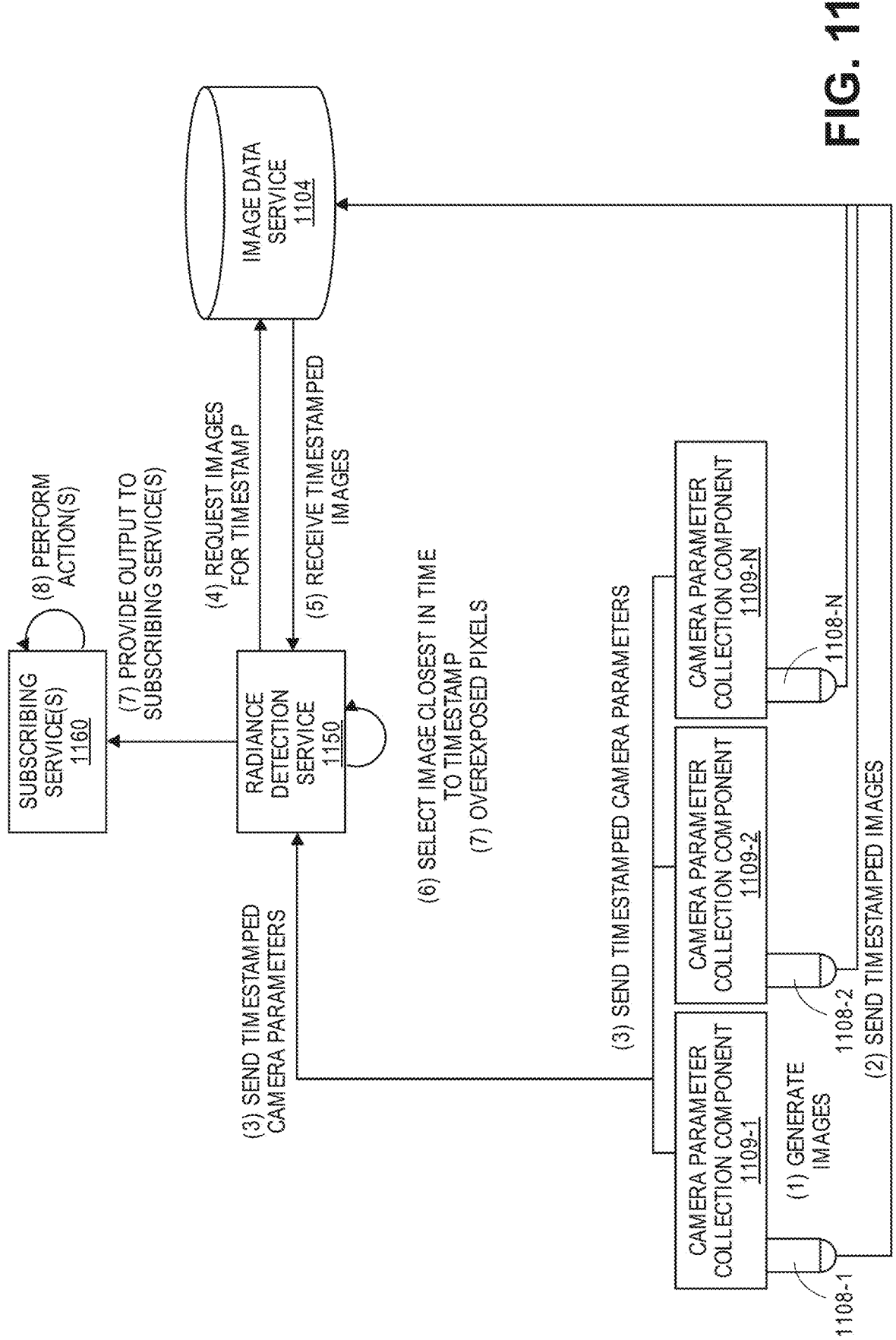
FIG. 11 is a block diagram of an illustrative implementation of a radiance detection service, in accordance with described implementations.

FIG. 11 is a block diagram of an illustrative implementation of a radiance detection service, in accordance with described implementations. As illustrated, a camera parameter collection component 1109-1, 1109-2 . . . 1109-N is coupled with or included in each imaging device 1108-1, 1108-2 . . . 1108-N. Each camera parameter collection component 1109 may include one or more processors and a memory storing program instructions that cause the one or more processors to collect camera parameters (e.g., integration time and gain) as image data is generated by the imaging device. In some implementations, the camera parameter collection components 1109 may collect camera parameters, associate a timestamp with each received set of camera parameters, and periodically provide the timestamped camera parameters to the camera parameter data store 1102. In other implementations, the camera parameter collection components may periodically collect camera parameters during a defined period of time and at the end of the defined period of time, compute, timestamp, and report a single set of timestamped camera parameters representative of the camera parameters for that period of time. For example, a camera parameter collection component may collect camera parameters from a corresponding camera every second during a thirty second period. At the end of the thirty second period, an average may be computed for each camera parameter based on the collected camera parameters and sent as the set of camera parameters during that period of time. The timestamp may represent the beginning of the thirty second period, the end of the thirty second period, or any other time during the thirty second period. In other implementations, the frequency of collection of camera parameters, the duration of time for collection, and/or the technique used to determine a set of camera parameters representative of the period of time may vary.

Each imaging device, as it generates image data of an area within the field of view of the imaging device, timestamps the image data with a time at which the image data was generated and sends the image data and corresponding timestamp to an image data service 1104 that stores the image data for each of the imaging devices 1108.

The radiance detection service 1150 receives the camera parameters sent by each of the camera parameter collection components 1109. The radiance detection service may include or be operating on one or more computing systems that include one or more processors and a memory storing program instructions that when executed perform the functions of the radiance detection service. The radiance detection service 1150, upon receipt of camera parameters, requests from the image data service 1104 image data generated by the respective imaging device 1108 that corresponds to the timestamp associated with the received camera parameters. The image data service 1104, upon receipt of a request, queries the stored image data to determine a series of images that include images generated before and after the timestamp. For example, the image data service may select a series of images generated by the camera during a five second period of time that begins before the timestamp and ends after the timestamp and provide the series of images back to the radiance detection service. In other implementations, the image data service may select a single image that is closest in time to the timestamp and return that image to the radiance detection service.

The radiance detection service, upon receiving the camera parameters and receiving the images from the data store, selects an image from the received images that has a corresponding time that is closest to the timestamp received with the camera parameters. The selected image is then processed to determine if all or a portion of the image data is overexposed, which may be indicative of direct sunlight shining on a portion of the objects within the field of view of the camera. For example, the radiance detection service 1150 may utilize one or more of the implementations discussed above to process the image data. Upon processing the image data, the radiance detection service generates an output that is sent to one or more subscribing services 1160 to indicate whether sunlight has been detected in the area corresponding to the camera. The indication may be an alarm, a flag, or any other form of output that may be received by one or more subscribing services.

The subscribing service(s) 1160, upon receiving an indication that sunlight has been detected in the image data, may perform one or more actions. For example, one or mechanical actions, such as altering the position of one or more objects (e.g., lowering blinds or screens) to block the sunlight from entering the materials handling facility may be performed in response to an indication that sunlight is detected. In other implementations, one or more services may adjust one or more algorithms that process or rely on the image data. In still other examples, one or more services may, in response to an indication that image data from a first imaging device includes image data representative of direct sunlight, select or receive image data from a second device for which an indication of sunlight detection has not been received. In some implementations, one or more camera parameters may be altered to account for the sunlight.

Figure 12:
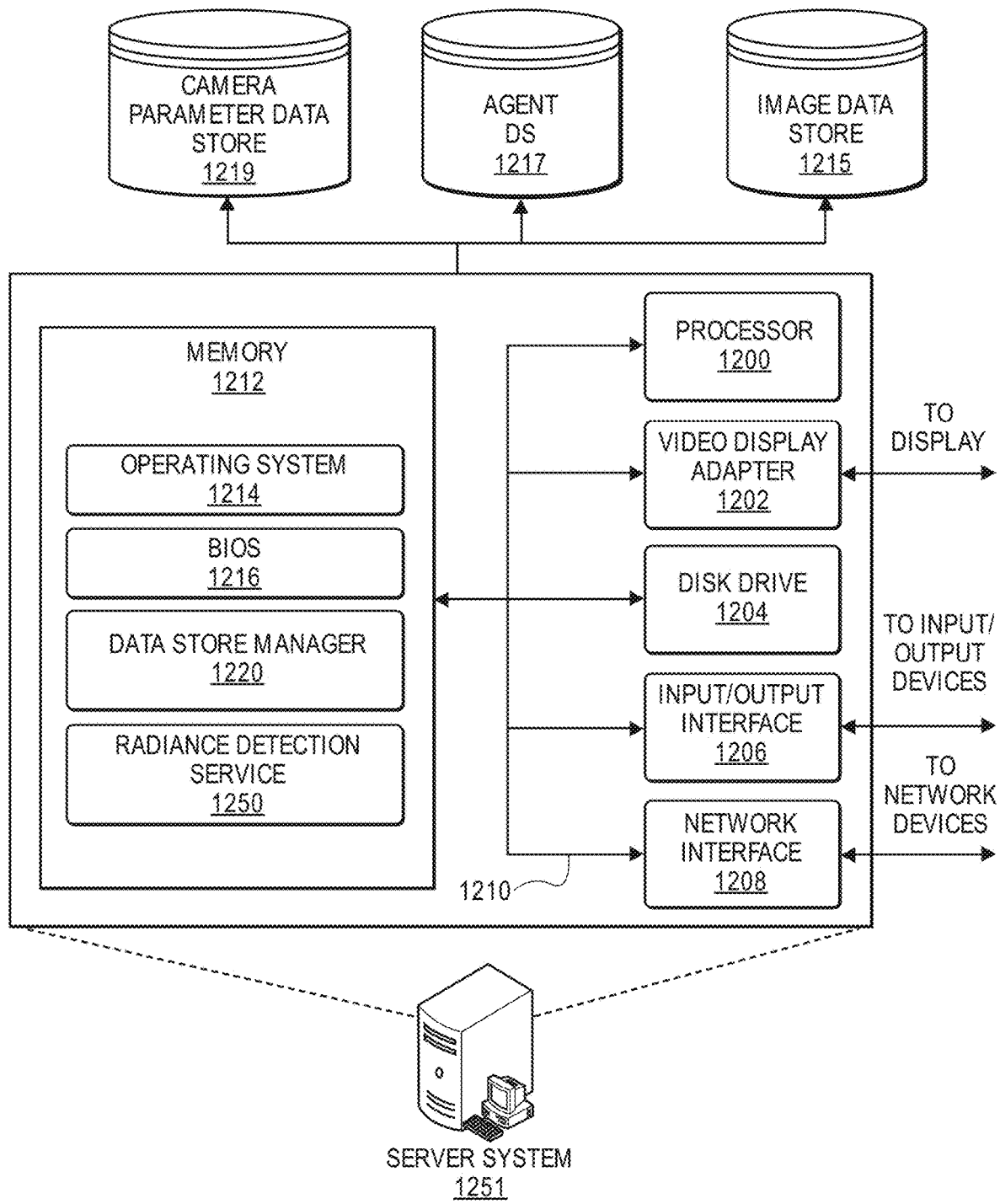
FIG. 12 is a block diagram of an illustrative implementation of a server system that may be used with various implementations.

FIG. 12 is a pictorial diagram of an illustrative implementation of a server system 1251, such as the server system 1251, that may be used in the implementations described herein. The server system 1251 may include a processor 1200, such as one or more redundant processors, a video display adapter 1202, a disk drive 1204, an input/output interface 1206, a network interface 1208, and a memory 1212. The processor 1200, the video display adapter 1202, the disk drive 1204, the input/output interface 1206, the network interface 1208, and the memory 1212 may be communicatively coupled to each other by a communication bus 1210.

The video display adapter 1202 provides display signals to a local display permitting an operator of the server system 1251 to monitor and configure operation of the server system 1251. The input/output interface 1206 likewise communicates with external input/output devices, such as a mouse, keyboard, scanner, or other input and output devices that can be operated by an operator of the server system 1251. The network interface 1208 includes hardware, software, or any combination thereof, to communicate with other computing devices. For example, the network interface 1208 may be configured to provide communications between the server system 1251 and other computing devices and/or services via a network, such as the network shown in FIG. 10.

The memory 1212 generally comprises random access memory (RAM), read-only memory (ROM), flash memory, and/or other volatile or permanent memory. The memory 1212 is shown storing an operating system 1214 for controlling the operation of the server system 1251. A binary input/output system (BIOS) 1216 for controlling the low-level operation of the server system 1251 is also stored in the memory 1212.

The memory 1212 additionally stores program code and data for providing network services. The data store manager application 1220 facilitates data exchange between the image data store 1215, the agent data store 1217, and/or the camera parameter data store 1219.

As used herein, the term "data store" refers to any device or combination of devices capable of storing, accessing and retrieving data which may include any combination and number of data servers, databases, data storage devices and data storage media in any standard, distributed or clustered environment. The server system 1251 can include any appropriate hardware and software for integrating with the data stores 1215, 1217, and 1219 as needed to execute aspects of the radiance detection service 1250.

The data stores 1215, 1217, and 1219 can include several separate data tables, databases or other data storage mechanisms and media for storing data relating to a particular aspect. For example, the data stores 1215, 1217, and 1219 illustrated include mechanisms for maintaining camera parameters (e.g., gain and integration time), agent information, images, etc.

It should be understood that there can be many other aspects that may be stored in the data stores 1215, 1217, and 1219. The data stores 1215, 1217, and 1219 are operable, through logic associated therewith, to receive instructions from the server system 1251 and obtain, update or otherwise process data in response thereto.

The memory 1212 may also include the radiance detection service 1250. The radiance detection service 1250 may be executable by the processor 1200 to implement one or more of the functions of the server system 1251. In one implementation, the radiance detection service 1250 may represent instructions embodied in one or more software programs stored in the memory 1212. In another implementation, the radiance detection service 1250 can represent hardware, software instructions, or a combination thereof.

It will be appreciated by those of ordinary skill in the art that such a system could operate equally well in a system having fewer or a greater number of components than are illustrated in FIG. 12. Thus, the depiction in FIG. 12 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and image processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

For example, while the implementations are described as detecting sunlight or direct sunlight, the disclosed implementations are equally applicable to detect other forms of light that cause overexposure or saturation of image data and should not be considered as limited to sunlight detection alone.

Aspects of the disclosed systems may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:
1. A computer implemented method, comprising:
under control of one or more computing systems configured with executable instructions, receiving a set of timestamped camera parameters corresponding to a camera;

receiving an image generated by the camera and corresponding to the set of timestamped camera parameters;

determining a first plurality of pixels of the image corresponding to a baseline model stored for the camera;

detecting a presence of an object represented in the image;

determining a second plurality of pixels of the image corresponding to the object;

selecting a third plurality of pixels from the image that do not include the first plurality of pixels or the second plurality of pixels;

computing, based at least in part on the set of timestamped camera parameters and the third plurality of pixels, a camera radiance value for the camera;

determining that the camera radiance value exceeds a threshold; and in response to a determining that the camera radiance value exceeds the threshold, sending an output to at least one subscribing service indicating an overexposure in the image from illumination in a field of view of the camera.

2. The computer implemented method of claim 1, wherein the set of timestamped camera parameters include an integration time and a gain of the camera.

3. The computer implemented method of claim 1, further comprising:

receiving a plurality of timestamped camera parameters, each of the plurality of timestamped camera parameters corresponding to a respective camera of a plurality of cameras, wherein the camera is one of the plurality of cameras.

4. The computer implemented method of claim 1 further comprising:

generating a gray-scale image from the image; and wherein the camera radiance value is based on an approximate radiance value computed for each pixel of the gray-scale image.

5. The computer implemented method of claim 1, further comprising:

determining a ratio between the camera radiance value and a baseline radiance value that is known for the camera; and determining that the ratio exceeds a second threshold; and in response to determining that the ratio exceeds the second threshold, determining that at least a portion of the image does not include data representative of the object is further based at least in part on the ratio exceeding the threshold.

6. The computer implemented method of claim 1, further comprising:

receiving second camera parameters corresponding to a second camera;

receiving a second image generated by the second camera and corresponding to the second camera parameters; and processing the second image, based at least in part on the second camera parameters, to determine a second camera radiance value for the second camera.

7. A system, comprising:

one or more processors; and a memory storing program instructions that when executed by the one or more processors further cause the one or more processors to at least:

determine a set of camera parameters corresponding to a camera;

receive an image generated by the camera and corresponding to the set of camera parameters;

determine a first plurality of pixels of the image corresponding to a baseline model stored for the camera;

detect a presence of an object represented in the image;

determine a second plurality of pixels of the image corresponding to the object;

select a third plurality of pixels from the image that do not include the first plurality of pixels or the second plurality of pixels;

compute, based at least in part on the set of camera parameters and the third plurality of pixels, a camera radiance value for the camera;

determine that the camera radiance value exceeds a threshold; and in response to a determination that the camera radiance value exceeds the threshold, send an output to at least one subscribing service indicating that direct sunlight or other illumination has been detected.

8. The system of claim 7, wherein the set of camera parameters include an integration time and a gain of the camera.

9. The system of claim 7, wherein the program instructions when executed by the one or more processors further cause the one or more processors to at least:

receive a plurality of camera parameters, each of the plurality of camera parameters corresponding to a respective camera of a plurality of cameras, wherein the camera is one of the plurality of cameras.

10. The system of claim 7, wherein the program instructions when executed by the one or more processors further cause the one or more processors to at least:

generate a gray-scale image from the image; and wherein the camera radiance value is based on an approximate radiance value computed for each pixel of the gray-scale image.

11. The system of claim 7, wherein the program instructions when executed by the one or more processors further cause the one or more processors to at least:

determine a ratio between the camera radiance value and a baseline radiance value that is known for the camera;

determine that the ratio exceeds a threshold; and in response to determination that the ratio exceeds the second threshold, determine that at least a portion of the image does not include data representative of the object is further based at least in part on the ratio exceeding the threshold.

12. The system of claim 7, wherein the program instructions when executed by the one or more processors further cause the one or more processors to at least:

receive second camera parameters corresponding to a second camera;

receive a second image generated by the second camera and corresponding to the second camera parameters; and process the second image, based at least in part on the second camera parameters, to determine a second camera radiance value for the second camera.

13. The system of claim 7, wherein the program instructions further include program instructions that cause the one or more processors to at least:

receive second camera parameters corresponding to the camera;

receive a second image generated by the camera and corresponding to the second camera parameters;
generate gray-scale image data from the second image;
determine a radiance value for the camera based at least in part on gray-scale image data; and
store the radiance value and the gray-scale image data as a baseline model for the camera.

14. The system of claim 13, wherein:
the second image includes depth information for each pixel of the second image, the depth information indicating a distance between the camera and an object represented by the respective pixel; and
the baseline model further includes the depth information.

15. The system of claim 14, wherein the program instructions that, when executed by the one or more processors, cause the one or more processors to detect a presence of an object, further include program instructions that when executed by the one or more processors further cause the one or more processors to at least:
determine the first plurality of pixels have a different depth information than the depth information maintained for those pixels in the baseline model; and
detect the presence of the object based on the determination that the first plurality of pixels have a different depth information.

16. The system of claim 7, wherein the program instructions further include program instructions that cause the one or more processors to at least:
send an output to at least one service indicating that at least a portion of the image does not include data representative of the object.

17. A method, comprising:
receiving a set of timestamped camera parameters corresponding to a camera;
receiving an image generated by the camera and corresponding to the set of timestamped camera parameters;
determining a first plurality of pixels of the image corresponding to a baseline model stored for the camera;
detecting a presence of an object represented in the image;
determining a second plurality of pixels of the image corresponding to the object;
selecting a third plurality of pixels from the image that do not include the first plurality of pixels or the second plurality of pixels;
computing, based at least in part on the set of timestamped camera parameters and the third plurality of pixels, a camera radiance value for the camera;
determining that the camera radiance value exceeds a threshold; and
in response to a determining that the camera radiance value exceeds the threshold, sending an output to at least one subscribing service indicating that direct sunlight or other illumination has been detected in a field of view of the camera.

18. The method of claim 17, wherein the set of timestamped camera parameters include an integration time and a gain of the camera.

19. The method of claim 17, further comprising:
receiving a plurality of timestamped camera parameters, each of the plurality of timestamped camera parameters corresponding to a respective camera of a plurality of cameras, wherein the camera is one of the plurality of cameras.

20. The method of claim 17, further comprising:
generating a gray-scale image from the image; and
wherein the camera radiance value is based on an approximate radiance value computed for each pixel of the gray-scale image.

* * * * *